(12) United States Patent
Imanilov

(10) Patent No.: US 12,010,606 B2
(45) Date of Patent: Jun. 11, 2024

(54) SELECTIVE DISTRIBUTION AND/OR RECEPTION OF WIRELESS COMMUNICATIONS SIGNALS IN A NON-CONTIGUOUS WIRELESS DISTRIBUTED COMMUNICATIONS SYSTEM (WDCS) FOR REDUCING DOWNLINK TRANSMISSION POWER AND/OR UPLINK NOISE

(71) Applicant: Corning Optical Communications LLC, Charlotte, NC (US)

(72) Inventor: Benjamin Imanilov, Hod haSharon (IL)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 332 days.

(21) Appl. No.: 17/374,342

(22) Filed: Jul. 13, 2021

(65) Prior Publication Data

US 2021/0345223 A1 Nov. 4, 2021

Related U.S. Application Data

(63) Continuation of application No. PCT/US2019/017991, filed on Feb. 14, 2019.
(Continued)

(51) Int. Cl.
*H04W 88/08* (2009.01)
*H04L 5/00* (2006.01)
(Continued)

(52) U.S. Cl.
CPC ............ *H04W 48/02* (2013.01); *H04L 5/0041* (2013.01); *H04W 48/20* (2013.01); *H04W 74/0833* (2013.01); *H04W 88/085* (2013.01)

(58) Field of Classification Search
CPC .......... H04W 74/0833; H04W 88/085; H04W 48/02; H04W 48/20; H04W 72/0453;
(Continued)

(56) References Cited

U.S. PATENT DOCUMENTS 9,438,318 B2 9/2016 Hanson et al.
2004/0170136 A1* 9/2004 Woo ................. H04W 36/0061
370/320

(Continued)

FOREIGN PATENT DOCUMENTS

EP 2348785 A1 7/2011

OTHER PUBLICATIONS

International Search Report and Written Opinion of the International Searching Authority; PCT/US2019/017991; dated Oct. 1, 2019; 11 pages; European Patent Office.

*Primary Examiner* — Chi Ho A Lee
(74) *Attorney, Agent, or Firm* — William D. Doyle

(57) ABSTRACT

Selective distribution and/or reception of wireless communications signals in a non-contiguous wireless distributed communications systems (WDCS) for reducing downlink transmission power and/or uplink noise is disclosed. A non-contiguous WDCS is a WDCS in which the remote units are clustered such that remote units with contiguous coverage areas receive downlink communications signals serviced by different cells to provide non-contiguous cell coverage areas. In one example, the WDCS is configured to selectively distribute, through each remote unit, only downlink communication signals for the cell that are identified as servicing the user equipment (UE) to conserve downlink power. In another example, the WDCS is configured to selectively receive uplink communications signals from remote units that contain user data from UE. Noise and/or interference signals associated with portions of the uplink communications signals that are not selectively received
(Continued)

(e.g., blocked) are not combined with the selectively received uplink communications signals, thus reducing uplink noise.

10 Claims, 17 Drawing Sheets

Related U.S. Application Data

(60) Provisional application No. 62/791,858, filed on Jan. 14, 2019.

(51) Int. Cl.
*H04W 48/02* (2009.01)
*H04W 48/20* (2009.01)
*H04W 74/0833* (2024.01)

(58) Field of Classification Search
CPC ... H04L 5/0094; H04L 5/0039; H04L 5/0041; H04L 5/0007
See application file for complete search history.

(56) References Cited

U.S. PATENT DOCUMENTS

| | | | |
|---|---|---|---|
| 2007/0133386 A1* | 6/2007 | Kim | H04L 27/266 370/203 |
| 2007/0211638 A1* | 9/2007 | Lee | H04L 47/824 370/329 |
| 2008/0232272 A1* | 9/2008 | Gelbman | H04L 61/103 370/254 |
| 2009/0069054 A1* | 3/2009 | Zangi | H04L 5/0082 455/562.1 |
| 2009/0323604 A1* | 12/2009 | De Jaeger | H04B 7/18539 370/329 |
| 2013/0083705 A1 | 4/2013 | Chung et al. | |
| 2013/0094454 A1 | 4/2013 | Soriaga et al. | |
| 2015/0016441 A1 | 1/2015 | Hanson et al. | |
| 2015/0103647 A1* | 4/2015 | Batz | H04W 48/04 370/230 |
| 2016/0029248 A1* | 1/2016 | Syed | H04W 72/52 370/235 |
| 2016/0219635 A1* | 7/2016 | Iwai | H04W 76/11 |
| 2018/0014201 A1 | 1/2018 | Hasarchi et al. | |
| 2018/0351727 A1 | 12/2018 | Hoffmann et al. | |
| 2021/0022189 A1* | 1/2021 | Beale | H04B 1/713 |

\* cited by examiner

SELECTIVE DISTRIBUTION AND/OR RECEPTION OF WIRELESS COMMUNICATIONS SIGNALS IN A NON-CONTIGUOUS WIRELESS DISTRIBUTED COMMUNICATIONS SYSTEM (WDCS) FOR REDUCING DOWNLINK TRANSMISSION POWER AND/OR UPLINK NOISE

CROSS-REFERENCE TO RELATED APPLICATIONS

This application is a continuation of International Application No. PCT/US2019/017991, filed Feb. 14, 2019, which claims the benefit of priority to U.S. Provisional Application No. 62/791,958, filed Jan. 14, 2019, the contents of which are relied upon and incorporated herein by reference in their entireties.

BACKGROUND

The disclosure relates generally to wireless distributed communications systems (WDCS), such as a distributed antenna system (DAS), and more particularly to selective distribution and/or reception of wireless communications signals in a non-contiguous WDCS for reducing downlink transmission power and/or uplink noise.

Wireless customers are increasingly demanding wireless communications services, such as cellular communications services and Wireless Fidelity (Wi-Fi) services. Thus, small cells, and more recently Wi-Fi services, are being deployed indoors. At the same time, some wireless customers use their wireless communication devices in areas that are poorly serviced by conventional cellular networks, such as inside certain buildings or areas where there is little cellular coverage. One response to the intersection of these two concerns has been the use of DASs. DASs include remote antenna units (RAUs) configured to receive and transmit communications signals to client devices within the antenna range of the RAUs. DASs can be particularly useful when deployed inside buildings or other indoor environments where the wireless communication devices may not otherwise be able to effectively receive radio frequency (RF) signals from a source.

In this regard, FIG. 1A illustrates a wireless distributed communications system (WDCS) 100 that is configured to distribute communications services to remote coverage areas 102(1)-102(N), where 'N' is the number of remote coverage areas. The WDCS 100 in FIG. 1A is provided in the form of a DAS 104. The DAS 104 can be configured to support a variety of communications services that can include cellular communications services, wireless communications services, such as RF identification (RFID) tracking, Wi-Fi, local area network (LAN), wireless LAN (WLAN), and wireless solutions (Bluetooth, Wi-Fi Global Positioning System (GPS) signal-based, and others) for location-based services, and combinations thereof, as examples. The remote coverage areas 102(1)-102(N) are created by and centered on RAUs 106(1)-106(N) connected to a centralized equipment 108 (e.g., a head-end controller, a central unit, or a head-end unit). The centralized equipment 108 may be communicatively coupled to a source transceiver 110 providing a cell, such as for example, a base transceiver station (BTS) or a baseband unit (BBU). In this regard, the centralized equipment 108 receives downlink communications signals 112D from the source transceiver 110 to be distributed to the RAUs 106(1)-106(N). The downlink communications signals 112D can include data communications signals and/or communication signaling signals, as examples. The centralized equipment 108 is configured with filtering circuits and/or other signal processing circuits that are configured to support a specific number of communications services in a particular frequency bandwidth (i.e., frequency communications bands). The downlink communications signals 112D are communicated by the centralized equipment 108 over a communications link 114 over their frequency to the RAUs 106(1)-106(N).

With continuing reference to FIG. 1A, the RAUs 106(1)-106(N) are configured to receive the downlink communications signals 112D from the centralized equipment 108 over the communications link 114. The downlink communications signals 112D are configured to be distributed to the respective remote coverage areas 102(1)-102(N) of the RAUs 106(1)-106(N). The RAUs 106(1)-106(N) are also configured with filters and other signal processing circuits that are configured to support all or a subset of the specific communications services (i.e., frequency communications bands) supported by the centralized equipment 108. In a non-limiting example, the communications link 114 may be a wired communications link, a wireless communications link, or an optical fiber-based communications link. Each of the RAUs 106(1)-106(N) may include an RF transmitter/receiver (not shown) and a respective antenna 116(1)-116(N) operably connected to the RF transmitter/receiver to wirelessly distribute the communications services to user equipment (UE) 118(1)-118(N) within the respective remote coverage areas 102(1)-102(N). The RAUs 106(1)-106(N) are also configured to receive uplink communications signals 112U from the UE 118(1)-118(N) in the respective remote coverage areas 102(1)-102(N) to be distributed to the source transceiver 110.

One of the advantages of the DAS 104 in FIG. 1A as the WDCS 100 is that a large coverage area can be achieved for the cell provided by source transceiver 110 to service the UEs 118(1)-118(N). The coverage area is provided by the multiple remote coverage areas 102(1)-102(N) provided by the respective RAUs 106(1)-106(N). No inter-cell interference exists between the RAUs 106(1)-106(N), because the RAUs 106(1)-106(N) are part of a same cell. Thus, handovers are not required when a UE 118(1)-118(N) moves from one coverage area 102(1)-102(N) to another coverage area 102(1)-102(N). However, one disadvantage of the DAS 104 in FIG. 1A is that each RAU 106(1)-106(N) receives and distributes downlink communications signals 112D for all UEs 118(1)-118(N) serviced by the cell of the source transceiver 110, even though not all the UEs 118(1)-118(N) are serviced by all the RAUs 106(1)-106(N). Each UE 118(1)-118(N) will be in communication range of a single RAU 106(1)-106(N) or a subset of the RAUs 106(1)-106(N), because the RAUs 106(1)-106(N) are ideally configured to provide non-overlapping remote coverage areas 102(1)-102(N). Thus, each RAU 106(1)-106(N) may transmit more energy than may be required to service the UEs 118(1)-118(N) in its respective remote coverage area 102(1)-102(N). Also, since the uplink communications signals 112U from the RAUs 106(1)-106(N) are received and summed together in the central equipment 108, the summed uplink communications signals 112U contain the full bandwidth of the channels of the cell along with the related bandwidth noise. This is shown in the WDCS 100 in FIG. 1B.

In the example in FIG. 1B, UE 118(1) transmits uplink data to RAU 106(1) using allocated frequency resources FR1 in a portion of the full channel bandwidth BW, which is distributed by the RAU 106(1) as uplink communication signal 112U(1) to the central unit 108. Similarly, UE 118(2) transmits uplink data to RAU 106(2) using allocated frequency resources FR2 in a portion of the full channel bandwidth BW, which is distributed by the RAU 106(2) as uplink communication signal 112U(2) to the central unit 108, and UE 118(N) transmits uplink data to RAU 106(N) using allocated frequency resources FRN in a portion of the full channel bandwidth BW, which is distributed by the RAU 106(1)-106(N) as uplink communication signal 112U(N) to the central unit 108. Since each RAU 106(1)-106(N) receives and processes the full channel bandwidth BW, it also transfers to full channel bandwidth BW and noise 120(1)-120(N) contained in the full channel bandwidth BW in each respective uplink communications signal 112U(1)-112U(N). A combiner circuit 122 in the central unit 108 the combines the uplink communications signals 112U(1)-112U(N) into a combined uplink communications signal 112U-C that then contains the combined noise 120(1)-120(N) over the full channel bandwidth BW of each of the uplink communications signals 112U(1)-112U(N). As a result, the noise floor of the uplink communications path in the central equipment 108 may have to be increased for filtering out unwanted noise signals from the uplink communications signals 112U(1)-112U(N) to achieve the desired signal-to-noise ratio (SNR). For example, the noise floor of the uplink communications path in the central equipment 108 may be 10 log N decibels (dB), wherein 'N' is the number of RAUs 106(1)-106(N). Alternatively, multiple small cell radio access nodes (RANs) would be employed in a WDCS to provide individual cells to UEs to reduce uplink noise. But, providing multiple small cells requires multiple signal source transceivers for each cell with increased complexity to service handovers.

No admission is made that any reference cited herein constitutes prior art. Applicant expressly reserves the right to challenge the accuracy and pertinency of any cited documents.

SUMMARY

Embodiments of the disclosure relate to selective distribution and/or reception of wireless communications signals in a non-contiguous wireless distributed communications systems (WDCS) for reducing downlink transmission power and/or uplink noise. The WDCS is configured to receive downlink communications signals from two or more signal sources (e.g., base stations) each forming a respective cell and distribute the downlink communications signals to a plurality of remote units in the WDCS. The remote units are configured to distribute the downlink communications signals in a respective remote coverage area to be received by user equipment (UE) in the respective remote coverage area. For example, the WDCS may be a distributed antenna system (DAS) wherein the remote units are remote antenna units. The WDCS is also configured to receive uplink communications signals from the remote units, which are received from UE in the remote coverage areas of the respective remote units, to be distributed to the signal sources. A non-contiguous WDCS is a WDCS that is arranged such that the remote units that have adjacent and/or overlapping remote coverage areas are served by different cells. In other words, in a non-contiguous WDCS, remote units that are served by the same cell are installed or placed such that their remote coverage areas are not adjacent and/or do not overlap.

In one exemplary aspect disclosed herein, the WDCS is configured to selectively distribute, through each remote unit, only the downlink communication signals (e.g., particular subcarriers) for the cell that is identified as servicing the UE. Other cell downlink communication signals that are not identified as servicing UE associated with a particular remote unit are blocked from being distributed by such remote unit. In this manner, as an example, downlink power may be conserved in the WDCS by the remote units not unnecessarily distributing downlink communication signals not servicing UE in the remote coverage areas of the remote units.

In another exemplary aspect disclosed herein, the WDCS is configured to selectively receive uplink communications signals (e.g., particular subcarriers) from the remote units that contain user data from UE. In this manner, only these selectively received portions of the uplink communications signals from the remote units that contain user data are combined to be distributed to the signal sources. Thus, only noise associated with the selectively received portions of the uplink communications signals are present in the combined uplink communications signals. Noise and/or interference signals associated with portions of the uplink communications signals that are not selectively received (e.g., blocked) are not combined with the combined selectively received uplink communications signals, thus reducing the overall noise in the combined selectively received uplink communications signals for an improved signal-to-noise ratio (SNR) resulting in a lower noise floor.

In other exemplary aspects, to be able to identify which remote units are associated with particular UE, to then selectively distribute and/or receive the downlink and/or uplink communication signals, the WDCS is configured as a non-contiguous WDCS. A non-contiguous WDCS is a WDCS in which the remote units are clustered such that remote units with contiguous (i.e., adjacent, neighbor) coverage areas receive downlink communications signals serviced by different cells to provide non-contiguous cell coverage areas. For example, one remote unit is configured to receive downlink communication signals for one cell, wherein an adjacent, neighbor remote unit is configured to receive downlink communications signals from a different cell. Thus, when a UE moves from one remote coverage area of a remote unit in the WDCS to another adjacent remote coverage area of a neighbor remote unit, the UE will request (e.g., through a physical random access channel (PRACH) message) to be serviced by the different cell servicing the neighbor remote unit. This enables the WDCS to avoid ambiguity in identifying which remote unit services a particular UE since the UE moving to a neighbor remote unit will trigger establishing communications with a different cell as opposed to a handoff to the same cell. In a contiguous WDCS, a UE moving from one remote unit to a neighbor remote unit both servicing the same cell may result in a handoff process that may not trigger the cell to be notified of change in remote unit serving the UE.

Thus, the aspects disclosed herein of a non-contiguous WDCS facilitate, for example, the distribution of communications signals from a cell to multiple remote units to be distributed to UE as a DAS in a point-to-multipoint architecture, while reducing downlink transmission power and/or uplink noise similar to a small cell radio access network (RAN) that is configured to distribute communications signals in a point-to-point architecture between a cell and a small cell radio access node.

In this regard, one embodiment of the disclosure relates to a selective router circuit for selectively routing downlink communications signals in a WDCS. The selective router circuit is configured to receive a cell downlink communications signal comprising a plurality of subcarrier sets transmitted by a cell radio, each subcarrier set among the plurality of subcarrier sets comprising one or more subcarriers, each subcarrier set assigned to a UE among a plurality of UEs. The selective router circuit is also configured to receive a subcarrier assignment indicator indicating the assignment of one or more subcarrier sets among the plurality of subcarrier sets to each UE among the plurality of UEs. The selective router circuit is also configured to determine an assignment of one or more UEs to a remote unit among a plurality of non-contiguous remote units in a remote unit cluster in a WDCS. The selective router circuit is also configured to determine which of the one or more subcarrier sets among the plurality of subcarrier sets are assigned to which remote unit among the plurality of non-contiguous remote units in the remote unit cluster, based on the determined assignment of the one or more UEs to the remote unit among the plurality of non-contiguous remote units and the subcarrier assignment indicator. The selective router circuit is also configured to selectively distribute to each remote unit among the plurality of non-contiguous remote units in the remote unit cluster, a cell downlink communications signal comprising the one or more subcarrier sets assigned to the remote unit, based on the determined assignment of the one or more subcarrier sets among the plurality of subcarrier sets to each remote unit among the plurality of non-contiguous remote units in the remote unit cluster.

An additional embodiment of the disclosure relates to a method of selectively routing downlink communications signals in a WDCS. The method comprises receiving a cell downlink communications signal comprising a plurality of subcarrier sets transmitted by a cell radio, each subcarrier set among the plurality of subcarrier sets comprising one or more subcarriers, each subcarrier set assigned to a UE among a plurality of UEs. The method also comprises receiving a subcarrier assignment indicator indicating the assignment of one or more subcarrier sets among the plurality of subcarrier sets to each UE among the plurality of UE. The method also comprises determining an assignment of one or more UEs to a remote unit among a plurality of non-contiguous remote units in a remote unit cluster in a WDCS. The method also comprises determining which of the one or more subcarrier sets among the plurality of subcarrier sets are assigned to which remote unit among the plurality of non-contiguous remote units in the remote unit cluster based on the determined assignment of the one or more UEs to the remote unit among the plurality of non-contiguous remote units and the subcarrier assignment indicator. The method also comprises selectively distributing to each remote unit among the plurality of non-contiguous remote units in the remote unit cluster, a cell downlink communications signal comprising the one or more subcarrier sets assigned to the remote unit, based on the determined assignment of the one or more subcarrier sets among the plurality of subcarrier sets to each remote unit among the plurality of non-contiguous remote units in the remote unit cluster.

An additional embodiment of the disclosure relates to a WDCS. The WDCS comprises a central unit configured to distribute one or more cell downlink communications signals over one or more downlink communications links to a plurality of remote units, and distribute received one or more remote uplink communications signals from the plurality of remote units from one or more uplink communications links to one or more cell radios. The WDCS also comprises the plurality of remote units, each remote unit among the plurality of remote units configured to distribute at least one received cell downlink communications signal among the one or more cell downlink communications signals from the one or more downlink communications links, to one or more UE, and distribute the one or more remote uplink communications signals from the one or more UE to the one or more uplink communications links. The WDCS also comprises a first remote unit cluster comprising one or more first remote units among a plurality of non-contiguous first remote units among the plurality of remote units, the plurality of non-contiguous first remote units assigned to a first cell radio among the one or more cell radios. The WDCS also comprises a selective router circuit. The selective router circuit is configured to receive a cell downlink communications signal comprising a plurality of subcarrier sets transmitted by a cell radio, each subcarrier set among the plurality of subcarrier sets comprising one or more subcarriers, each subcarrier set assigned to a UE among a plurality of UEs. The selective router circuit is also configured to receive a subcarrier assignment indicator indicating the assignment of one or more subcarrier sets among the plurality of subcarrier sets to each UE among the plurality of UEs. The selective router circuit is also configured to determine an assignment of one or more UEs to a remote unit among a plurality of non-contiguous remote units in a remote unit cluster in a WDCS. The selective router circuit is also configured to determine which of the one or more subcarrier sets among the plurality of subcarrier sets are assigned to which remote unit among the plurality of non-contiguous remote units in the remote unit cluster, based on the determined assignment of the one or more UEs to the remote unit among the plurality of non-contiguous remote units and the subcarrier assignment indicator. The selective router circuit is also configured to selectively distribute to each remote unit among the plurality of non-contiguous remote units in the remote unit cluster, a cell downlink communications signal comprising the one or more subcarrier sets assigned to the remote unit, based on the determined assignment of the one or more subcarrier sets among the plurality of subcarrier sets to each remote unit among the plurality of non-contiguous remote units in the remote unit cluster.

An additional embodiment of the disclosure relates to a selective router circuit for selectively routing uplink communications signals in a WDCS. The selective router circuit is configured to receive a plurality of remote uplink communications signals each comprising one or more subcarrier sets among a plurality of subcarrier sets of a cell radio from a remote unit among a plurality of non-contiguous remote units in a remote unit cluster in a WDCS, each of the plurality of subcarrier sets comprising one or more subcarriers, each subcarrier set assigned to a UE among a plurality of UEs. The selective router circuit is also configured to receive a subcarrier assignment indicator indicating the assignment of one or more subcarrier sets among the plurality of subcarrier sets to each UE among the plurality of UEs. The selective router circuit is configured to determine an assignment of one or more UEs to a remote unit among the plurality of non-contiguous remote units in the remote unit cluster. The a selective router circuit is also configured to determine which of the one or more subcarrier sets among the plurality of subcarrier sets are assigned to which remote unit among the plurality of non-contiguous remote units in the remote unit cluster, based on the determined assignment of the one or more UEs to the remote unit among the plurality of non-contiguous remote units and the subcarrier assignment indicator. The selective router circuit is also configured to selectively block distribution of the one or more subcarrier sets in each of the received plurality of remote uplink communications signals not assigned to the remote unit among the plurality of non-contiguous remote units in the remote unit cluster from which the remote uplink communication signal is received, based on the determined assignment of the one or more subcarrier sets among the plurality of subcarrier sets to each remote unit among the plurality of non-contiguous remote units in the remote unit cluster.

An additional embodiment of the disclosure relates to a method of selectively routing uplink communications signals in a WDCS. The method comprises receiving a plurality of remote uplink communications signals each comprising one or more subcarrier sets among a plurality of subcarrier sets of a cell radio from a remote unit among a plurality of non-contiguous remote units in a remote unit cluster in a WDCS, each of the plurality of subcarrier sets comprising one or more subcarriers, each subcarrier set assigned to a user equipment (UE) among a plurality of UE. The method also comprises receiving a subcarrier assignment indicator indicating the assignment of one or more subcarrier sets among the plurality of subcarrier sets to each UE among the plurality of UEs. The method also comprises determining an assignment of one or more UEs to a remote unit among the plurality of non-contiguous remote units in the remote unit cluster. The method also comprises determining which of the one or more subcarrier sets among the plurality of subcarrier sets are assigned to which remote unit among the plurality of non-contiguous remote units in the remote unit cluster, based on the determined assignment of the one or more UEs to the remote unit among the plurality of non-contiguous remote units and the subcarrier assignment indicator. The method also comprises selectively blocking distribution of the one or more subcarrier sets in each of the received plurality of remote uplink communications signals not assigned to the remote unit among the plurality of non-contiguous remote units in the remote unit cluster from which the remote uplink communication signal is received, based on the determined assignment of the one or more subcarrier sets among the plurality of subcarrier sets to each remote unit among the plurality of non-contiguous remote units in the remote unit cluster.

An additional embodiment of the disclosure relates to a WDCS. The WDCS comprises a central unit configured to distribute one or more cell downlink communications signals over one or more downlink communications links to a plurality of remote units, and distribute received one or more remote uplink communications signals from the plurality of remote units from one or more uplink communications links to one or more cell radios. The WDCS also comprises the plurality of remote units, each remote unit among the plurality of remote units configured to distribute at least one received cell downlink communications signal among the one or more cell downlink communications signals from the one or more downlink communications links, to one or more UEs, and distribute the one or more remote uplink communications signals from the one or more UE to the one or more uplink communications links. The WDCS also comprises a first remote unit cluster comprising one or more first remote units among a plurality of non-contiguous first remote units among the plurality of remote units, the plurality of non-contiguous first remote units assigned to a first cell radio among the one or more cell radios. The WDCS also comprises a selective router circuit. The selective router circuit is configured to receive a plurality of remote uplink communications signals each comprising one or more subcarrier sets among a plurality of subcarrier sets of a cell radio from a remote unit among a plurality of non-contiguous remote units in a remote unit cluster in a WDCS, each of the plurality of subcarrier sets comprising one or more subcarriers, each subcarrier set assigned to a UE among a plurality of UEs. The selective router circuit is also configured to receive a subcarrier assignment indicator indicating the assignment of one or more subcarrier sets among the plurality of subcarrier sets to each UE among the plurality of UEs. The selective router circuit is configured to determine an assignment of one or more UEs to a remote unit among the plurality of non-contiguous remote units in the remote unit cluster. The a selective router circuit is also configured to determine which of the one or more subcarrier sets among the plurality of subcarrier sets are assigned to which remote unit among the plurality of non-contiguous remote units in the remote unit cluster, based on the determined assignment of the one or more UEs to the remote unit among the plurality of non-contiguous remote units and the subcarrier assignment indicator. The selective router circuit is also configured to selectively block distribution of the one or more subcarrier sets in each of the received plurality of remote uplink communications signals not assigned to the remote unit among the plurality of non-contiguous remote units in the remote unit cluster from which the remote uplink communication signal is received, based on the determined assignment of the one or more subcarrier sets among the plurality of subcarrier sets to each remote unit among the plurality of non-contiguous remote units in the remote unit cluster.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure and are incorporated in and constitute a part of this specification. The drawings illustrate one or more embodiment(s), and together with the description serve to explain principles and operation of the various embodiments.

DETAILED DESCRIPTION

Figure 1A:
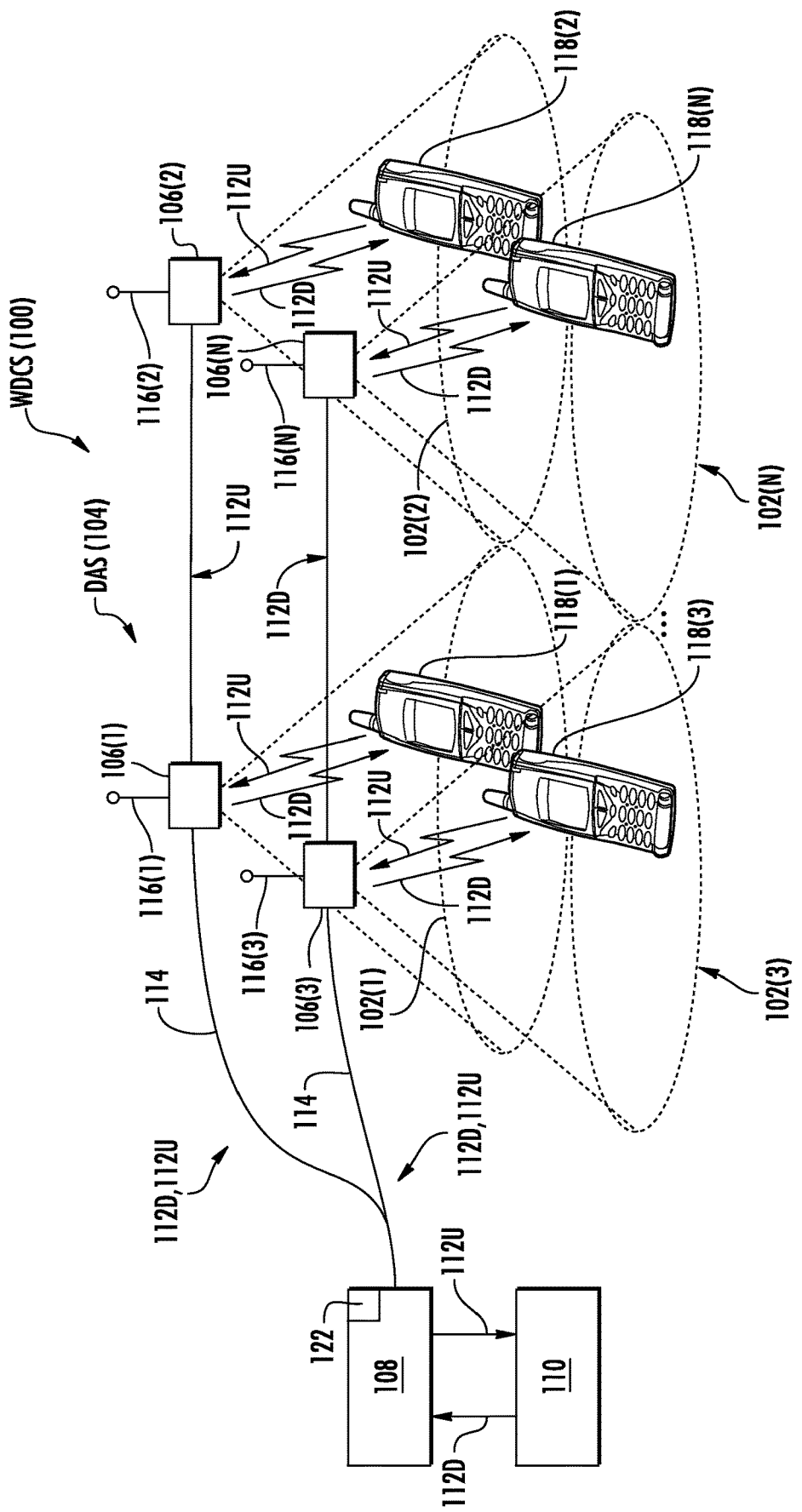
FIG. 1A is a schematic diagram of an exemplary wireless distributed communications system (WDCS) in the form of a distributed antenna system (DAS)
Figure 1B:
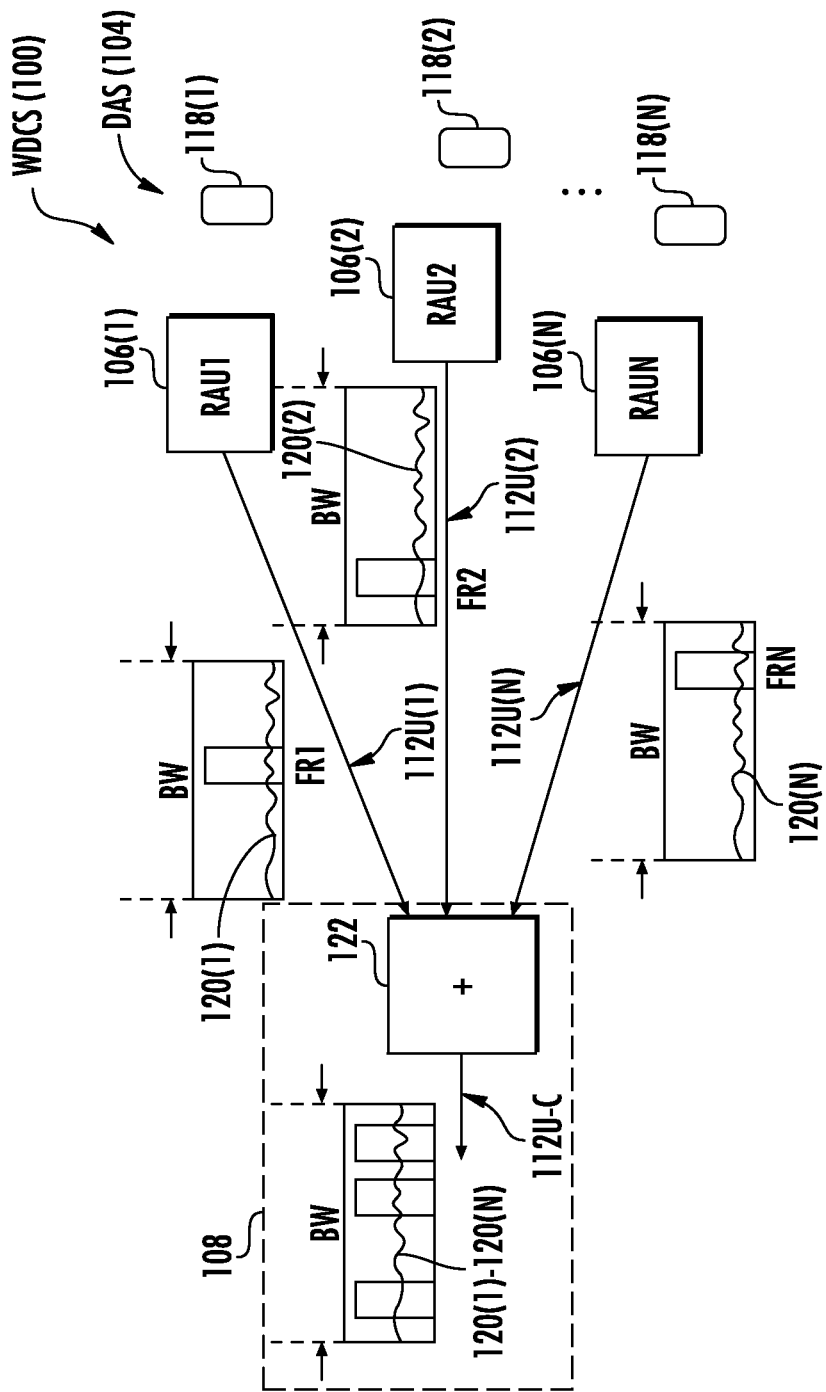
FIG. 1B illustrates uplink communications in the WDCS in FIG. 1A showing where the uplink communications signals distributed by the remote units are summed by a combiner circuit into a combined uplink communications signal which contains the aggregated noise from the individual uplink communications signals.

Embodiments of the disclosure relate to selective distribution and/or reception of wireless communications signals in a non-contiguous wireless distributed communications systems (WDCS) for reducing downlink transmission power and/or uplink noise. The WDCS is configured to receive downlink communications signals from two or more signal sources (e.g., base stations) each forming a respective cell and distribute the downlink communications signals to a plurality of remote units in the WDCS. The remote units are configured to distribute the downlink communications signals in a respective remote coverage area to be received by user equipment (UE) in the respective remote coverage area. For example, the WDCS may be a distributed antenna system (DAS) wherein the remote units are remote antenna units. The WDCS is also configured to receive uplink communications signals from the remote units, which are received from UE in the remote coverage areas of the respective remote units, to be distributed to the signal sources. A non-contiguous WDCS is a WDCS that is arranged such that the remote units that have adjacent and/or overlapping remote coverage areas are served by different cells. In other words, in a non-contiguous WDCS, remote units that are served by the same cell are installed or placed such that their remote coverage areas are not adjacent and/or do not overlap.

In one exemplary aspect disclosed herein, the WDCS is configured to selectively distribute, through each remote unit, only the downlink communication signals (e.g., particular subcarriers) for the cell that is identified as servicing the UE. Other cell downlink communication signals that are not identified as servicing UE associated with a particular remote unit are blocked from being distributed by such remote unit. In this manner, as an example, downlink power may be conserved in the WDCS by the remote units not unnecessarily distributing downlink communication signals not servicing UE in the remote coverage areas of the remote units.

In another exemplary aspect disclosed herein, the WDCS is configured to selectively receive uplink communications signals (e.g., particular subcarriers) from the remote units that contain user data from UE. In this manner, only these selectively received portions of the uplink communications signals from the remote units that contain user data are combined to be distributed to the signal sources. Thus, only noise associated with the selectively received portions of the uplink communications signals are present in the combined uplink communications signals. Noise and/or interference signals associated with portions of the uplink communications signals that are not selectively received (e.g., blocked) are not combined with the combined selectively received uplink communications signals, thus reducing the overall noise in the combined selectively received uplink communications signals for an improved signal-to-noise ratio (SNR) resulting in a lower noise floor.

Figure 2:
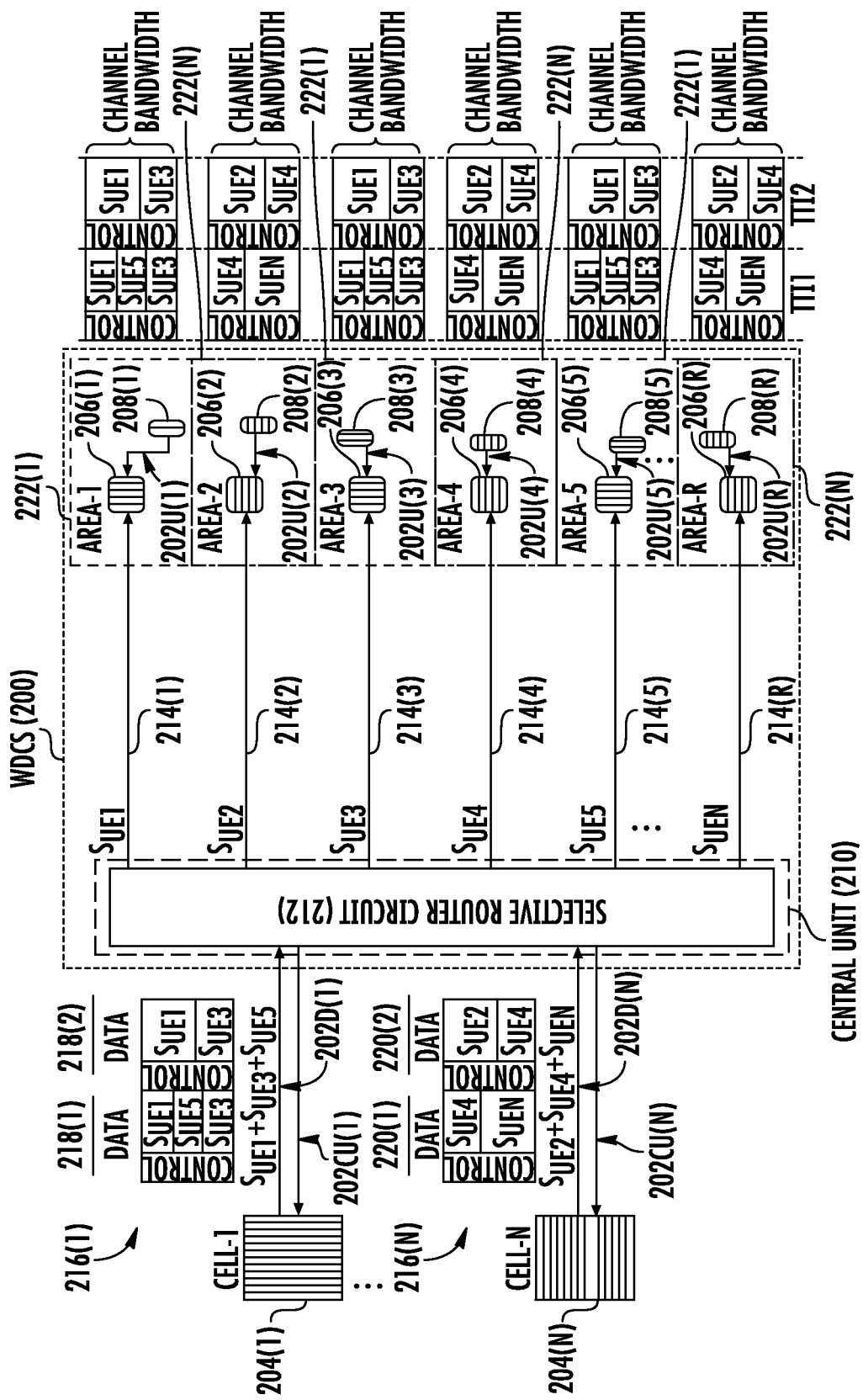
FIG. 2 is a schematic diagram of an exemplary non-contiguous WDCS configured to selectively distribute downlink communications signals to user equipment (UE) from a cell identified as servicing the UE for reducing downlink transmission power, while downlink communications signals not identified as servicing the UE are blocked from being distributed to the remote unit communicating with the UE.

FIG. 2 is a schematic diagram of an exemplary non-contiguous WDCS 200 configured to selectively distribute cell downlink communications signals 202D(1)-202D(N) received from respective cell radios 204(1)-204(N) (referred to herein as cells 204(1)-204(N)) to remote units 206(1)-206(R) to be distributed to UE 208(1)-208(R) identified as servicing the respective UEs 208(1)-208(R). For example, the WDCS 200 may be a DAS, a radio access network (RAN), such as small cell RAN, or system with remote radio heads (RRHs) as examples. The cells 204(1)-204(N) are signal sources, and may be a cellular base transceiver station (BTS) as an example. The WDCS 200 includes a central unit 210 that includes a selective router circuit 212. The selective router circuit 212 is configured to distribute the received cell downlink communications signals 202D(1)-202D(N) over respective communications links 214(1)-214(R) coupled to respective remote units 206(1)-206(R), which are then distributed in respective remove coverage areas AREA-1-AREA-R of the remote units 206(1)-206(R). UE 208(1)-208(R) in a remote coverage area AREA-1-AREA-R can receive the cell downlink communications signals 202D(1)-202D(N) as downlink signals for establishing and/or conducting a communications session with a cell 204(1)-204(N). For example, the remote units 206(1)-206(R) may be remote antenna units (RAUs) that are configured to radiate the cell downlink communications signals 202D(1)-202D(N) through respective antennas wirelessly to the UE 208(1)-208(R) as wireless communications devices in the respective remove coverage areas AREA-1-AREA-R. As another example, the remote units 206(1)-206(R) may be remote radio heads (RRHs) that are radios configured to transmit cell downlink communications signals 202D(1)-202D(N) through respective antennas wirelessly to the UE 208(1)-208(R) as wireless communications devices in the respective remove coverage areas AREA-1-AREA-R. The remote units 206(1)-206(R) in the WDCS 200 are also configured to receive remote uplink communications signals 202U(1)-202U(R) from the UE 208(1)-208(R) and distribute such remote uplink communications signals 202U(1)-202U(R) over the communications links 214(1)-214(R) to the central unit 210. The selective router circuit 212 is configured to combine the remote uplink communications signals 202U(1)-202U(R) from the remote units 206(1)-206(R) serviced by the same cell 204(1)-204(N) into respective combined uplink communications signals 202CU(1)-202CU(N) and distribute such combined uplink communications signals 202CU(1)-202CU(N) to the respective cells 204(1)-204(N).

As will be discussed in more detail below, the selective router circuit 212 in the WDCS 200 is configured to selectively distribute the cell downlink communications signals 202D(1)-202D(N) received from respective cells 204(1)-204(N) to remote units 206(1)-206(R) to be distributed to UE 208(1)-208(R) identified as servicing the respective UEs 208(1)-208(R). This is opposed to all the cell downlink communications signals 202D(1)-202D(N) for a particular cell 204(1)-204(N) being communicated to each remote unit among the remote units 206(1)-206(R) that is serviced by the particular cell 204(1)-204(N). In this manner, unnecessary signals and associated bandwidth for UEs 208(1)-208(R) that are not served by a particular remote unit 206(1)-206(R) and its servicing cell 204(1)-204(N) are not distributed to such particular remote units 206(1)-206(R). Cell downlink communication signals 202D(1)-202D(N) not identified as servicing the UE 208(1)-208(R) are blocked from being distributed to the remote unit 206(1)-206(R) communicating with its serviced UE 208(1)-208(R). This can reduce downlink transmission power in the WDCS 200.

Figure 3:
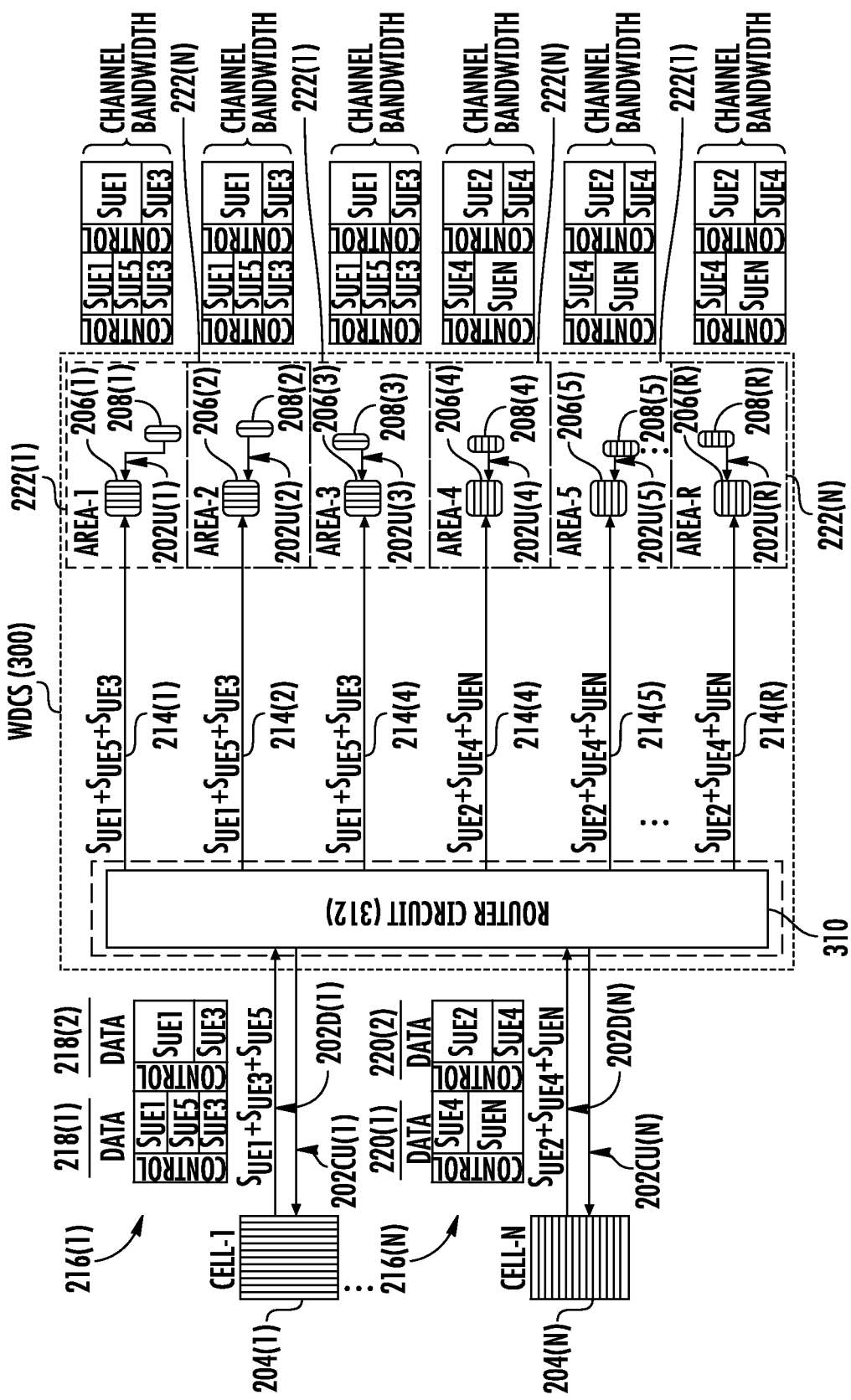
FIG. 3 is a schematic diagram of a contiguous WDCS configured to distribute downlink communications signals received from signal sources to all remote units in the WDCS.

One reason that it may be desired to configure to selective router circuit 212 in the WDCS 200 in FIG. 2 to selectively distribute the cell downlink communications signals 202D(1)-202D(N), is because the cell downlink communications signals 202D(1)-202D(N) may use a time-based format that allows for multiple data elements corresponding to different serviced UE 208(1)-208(R) to be included in different time-based radio subframes 218(1)-218(N), 220(1)-220(N). However, the same remote unit 206(1)-206(R) in a given remote unit cluster 222(1)-222(N) may not service all the UEs 208(1)-208(R). This is shown for example in the radio subframe 218(1) of the cell downlink communications signal 202D(1), includes user data for UEs 208(1), 208(3), and 208(5), which occupy respective subcarrier sets $S_{UE1}$, $S_{UE3}$, SUES of radio resources each comprising one or more subcarriers for cell 204(1). The radio subframe 218(1) of the cell downlink communications signal 202D(1) includes user data for UEs 208(1), 208(3), and 208(5), which occupy respective subcarrier sets $S_{UE1}$, $S_{UE3}$, SUES of radio resources each comprising one or more subcarriers for cell 204(1). However, each of the UEs 208(1), 208(3), and 208(5) associated with cell 204(1) are shown as being serviced by separate respective remote units 206(1), 206(3), 206(5) in remote unit cluster 222(1). Thus, instead of the selective router circuit 212 distributing the respective subcarrier sets $S_{UE1}$, $S_{UE3}$, SUES of the cell downlink communications signals 202D(1) over each communications link 214(1), 214(3), 214(5) to each remote unit 206(1), 206(3), 206(5), the selective router circuit 212 can be configured to identify servicing relationships between the remote units 206(1), 206(3), 206(5) and the UEs 208(1), 208(3), and 208(5). The selective router circuit 212 can then selectively distribute the respective subcarrier sets $S_{UE1}$, $S_{UE3}$, SUES of the cell downlink communications signals 202D(1) for the first radio subframe 218(1) in a radio frame 216(1) separately over each communications link 214(1), 214(3), 214(5) to each of the remote units 206(1), 206(3), 206(5) to conserve power. This is opposed to an alternative contiguous WDCS 300 in FIG. 3, wherein a router circuit 312 provided in a central unit 310 therein is configured to, for example, distribute all the subcarrier sets $S_{UE1}$, $S_{UE3}$, SUES in the cell downlink communications signal 202D(1) for the first radio subframe 218(1) to all the remote units 206(1), 206(3), 206(5) in the first remote unit cluster 222(1). In the WDCS 300 in FIG. 3, the router circuit 312 is configured to distribute all the subcarrier sets $S_{UE1}$, $S_{UE3}$, SUES in the cell downlink communications signal 202D(1) to all the remote units 206(1), 206(3), 206(5) regardless of whether a particular remote unit 206(1), 206(3), 206(5) services a UE 208(1), 208(3), 208(5) to be served by a subcarrier set $S_{UE1}$, $S_{UE3}$, SUES. Common elements between the WDCS 200 in FIG. 2 and the WDCS 300 in FIG. 3 are illustrated with common element numbers, and are not re-described.

Similarly, with reference back to the WDCS 200 in FIG. 2, the second radio subframe 218(2) of the cell downlink communications signal 202D(1) includes user data for UEs 208(1) and 208(3), which occupy respective subcarrier sets $S_{UE1}$, $S_{UE3}$ of radio resources each comprising one or more subcarriers for cell 204(1). Thus, the selective router circuit 212 can be configured to selectively distribute the respective subcarrier sets $S_{UE1}$, $S_{UE3}$ of the cell downlink communications signals 202D(1) for the second radio subframe 218(2) separately over communications links 214(1), 214(3) to each of the remote units 206(1), 206(3) in the remote unit cluster 222(1) to conserve power. The subcarrier sets $S_{UE1}$, $S_{UE3}$ containing respective user data for UE 208(1), 208(3) are not transmitted to remote unit 206(5) for the second radio subframe 218(2). This is opposed to the contiguous WDCS 300 in FIG. 3, wherein the router circuit 312 provided in the central unit 310 therein is configured to, for example, distribute all the subcarrier sets $S_{UE1}$, $S_{UE3}$ in the cell downlink communications signal 202D(1) for the second radio subframe 218(2) to all the remote units 206(1), 206(3), 206(5) in the first remote unit cluster 222(1). In the WDCS 300 in FIG. 3, the router circuit 312 is configured to distribute all the subcarrier sets $S_{UE1}$, $S_{UE3}$, SUES in the cell downlink communications signal 202D(1) to all the remote units 206(1), 206(3), 206(5) regardless of whether a particular remote units 206(1), 206(3), 206(5) services a UE 208(1), 208(3), 208(5) to be served by the subcarrier set $S_{UE1}$, $S_{UE3}$.

Figure 4:
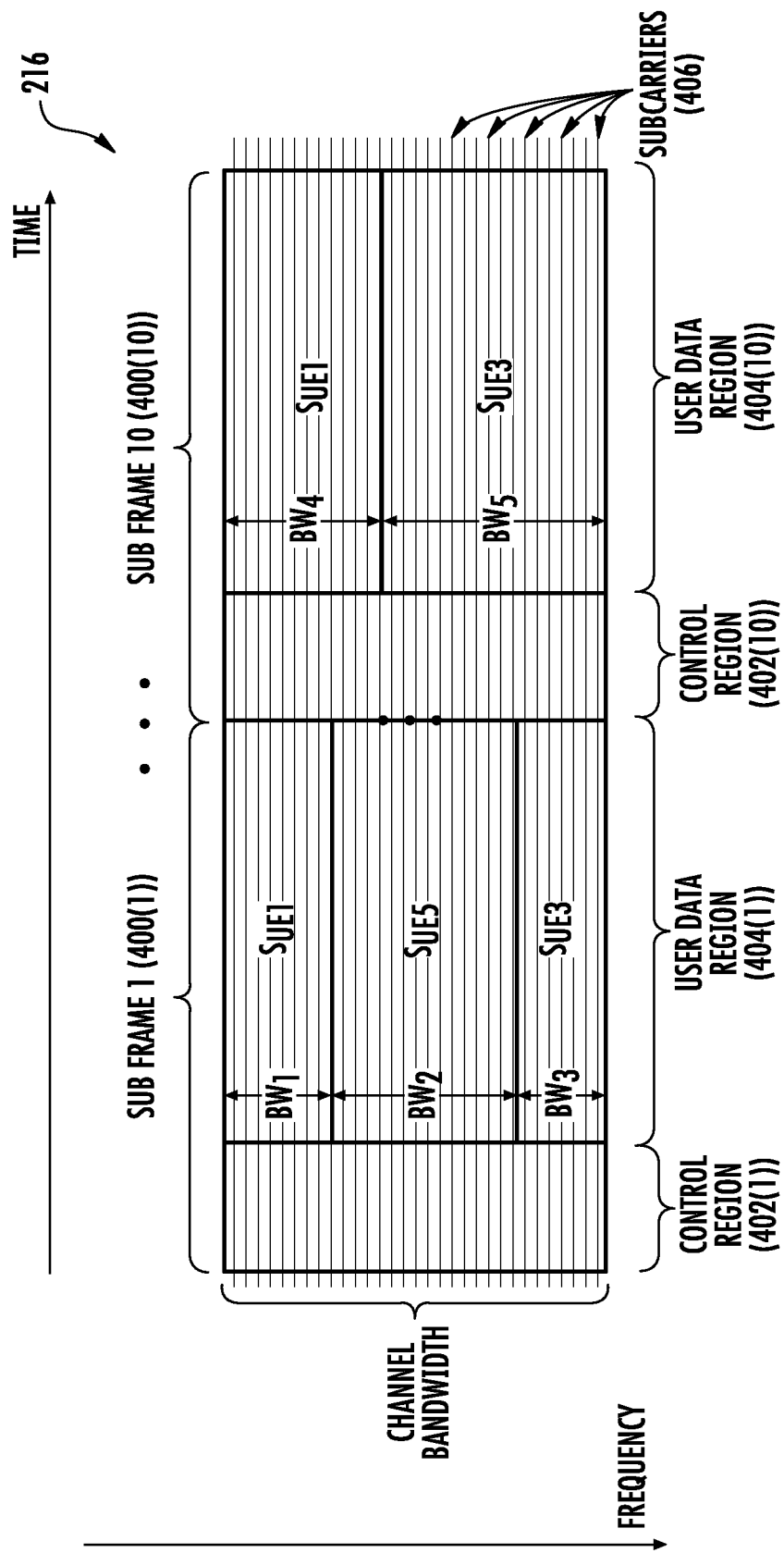
FIG. 4 is a diagram illustrating an exemplary consecutive long term evolution (LTE) downlink subframe illustrating a time dimension provided for each data element that includes the frequency resources (i.e., subcarriers) over the bandwidth of a cell service and a frequency dimension showing the assignment of subcarriers over the bandwidth to particular UE.

FIG. 4 is a diagram illustrating an exemplary consecutive long term evolution (LTE) radio frame 216 as an example of a radio frame that could be employed as the radio frames 216(1), 216(2) for the downlink communications signals 202D(1), 202D(N) in the WDCS 200 in FIG. 2. As shown in FIG. 4, the radio frame 216 includes ten (10) radio subframes 400(1)-400(10). Each radio subframe 400(1)-410(10) includes two regions: a respective control region 402(1)-402(10) and a respective user data region 404(1)-404(10). The control region 402(1)-402(10) is used for transmitting broadcast management and control data intended for all users UEs 208(1)-208(R) for the cell transmitting radio frame 216 as well as management and control data intended for specific UEs 208(1)-208(R). The user data region 404(1)-404(10) is used for transmitting data for specific UEs 208(1)-208(R). A mechanism called "scheduler" determines to which of the UEs 208(1)-208(R) the user data and related management and control data will be sent at each radio subframe 400(1)-400(10), and which frequency resources will be used for delivering this data. The scheduling information is transmitted to the UEs 208(1)-208(R) at the control region 402(1)-402(10).

With continuing reference to FIG. 4, the radio frame 216 includes a time dimension that includes the time duration of the various radio frame elements and a frequency dimension. The time dimension includes the duration of the control region 402(1)-402(10) for each radio subframe 400(1)-400(10) and the duration of each user data region 404(1)-404(10). In LTE, each radio subframe 400(1)-400(10) has a duration of 1 millisecond (ms) and a frequency dimension. The one (1) ms subframe time is also called the Transmission Time Interval (TTI). The frequency dimension of each radio subframe 400(1)-400(10) provides the frequency resources used for each data element in the user data region 404(1)-404(10) for associated UEs 208(1)-208(R). Frequency resources in each radio subframe 400(1)-400(10) are realized in subcarriers 406 that spread along the channel bandwidth. In LTE, in most cases, the subcarriers 406 are positioned 15 kiloHertz (KHz) apart from each other. A 10 MHz LTE channel contains 1200 subcarriers 406. A servicing cell determines the amount of frequency resources (i.e., subcarriers 406) in each radio subframe 400(1)-400(10) to be dedicated to be serviced in each radio subframe 400(1)-400(10) for the serviced UEs 208(1)-208(R). The subcarriers 406 assigned to a particular serviced UEs 208(1)-208(R) in a given radio subframe 400(1)-400(10) form a subcarrier set. For example, radio subframe 400(1) includes a subcarrier set $S_{UE1}$ for UE 208(1) covering bandwidth $BW_1$ of subcarriers 406, $S_{UE3}$ for UE 208(3) covering bandwidth $BW_3$ of subcarriers 406, and subcarrier set SUES for UE 208(5) covering bandwidth $BW_2$ of subcarriers 406. Radio subframe 400(10) includes a subcarrier set $S_{UE1}$ for UE 208(1) covering bandwidth $BW_4$ of subcarriers 406, and $S_{UE3}$ for UE 208(3) covering bandwidth $BW_5$ of subcarriers 406. The bandwidths $BW_4$ and $BW_5$ of subcarriers 406 allocated for subcarrier sets $S_{UE1}$, SUES for UEs 208(1), 208(3) in radio subframe 400(10) can be larger than bandwidths $BW_1$, $BW_3$, $BW_5$ in radio subframe 400(1), because radio subframe 400(10) does not include data for UE 208(5).

With reference back to FIG. 2, the selective router circuit 212 in the WDCS 200 in FIG. 2 can also be configured to selectively route the cell downlink communications signal 202D(N) for cell 204(N) to remote units 206(1)-206(R) in the second remote unit cluster 222(2) associated with cell 204(N). This is shown for example in the radio subframe 220(2) of the cell downlink communications signal 202D(N) that includes user data for UEs 208(4), 208(N), which occupy respective subcarrier sets $S_{UE4}$, $S_{UEN}$ of radio resources each comprising one or more subcarriers for cell 204(N). However, each of the UEs 208(4), 208(R) associated with cell 204(2) are shown as being serviced by separate respective remote units 206(4), 206(R) in the second remote unit cluster 222(2). Thus, instead of the selective router circuit 212 distributing the respective subcarrier sets $S_{UE4}$, $S_{UEN}$ of the cell downlink communications signals 202D(N) over each communications link 214(4), 214(R) to each remote unit 206(4), 206(R), the selective router circuit 212 can be configured to identify servicing relationships between the remote units 206(4), 206(N) and the UEs 208(4), 208(N). The selective router circuit 212 can then selectively distribute the respective subcarrier sets $S_{UE4}$, $S_{UEN}$ of the cell downlink communications signals 202D(N) for the second radio subframe 220(1) separately over each communications link 214(4), 214(N) to each of the remote units 206(4), 206(N) to conserve power.

Similarly, the second radio subframe 220(2) of the cell downlink communications signal 202D(N) includes user data for UEs 208(2), 208(4) which occupy respective subcarrier sets $S_{UE2}$, $S_{UE4}$ of radio resources each comprising one or more subcarriers for cell 204(2). Thus, the selective router circuit 212 can be configured to selectively distribute the respective subcarrier sets $S_{UE2}$, $S_{UE4}$ of the cell downlink communications signals 202D(N) for the second radio subframe 220(2) separately over communications links 214(2), 214(4) to each of the remote units 206(2), 206(4) in the second remote unit cluster 222(2) to conserve power. The subcarrier sets $S_{UE2}$, $S_{UE4}$ containing respective user data for UE 208(2), 208(4) are not transmitted to remote unit 206(R) for the second radio subframe 220(2).

As discussed above, the remote units 206(1)-206(R) in the WDCS 200 in FIG. 2 are also configured to receive remote uplink communications signals 202U(1)-202U(R) from the UE 208(1)-208(R) and distribute such remote uplink communications signals 202U(1)-202U(R) communications links 214(1)-214(R) to the central unit 210. The selective router circuit 212 is configured to combine the remote uplink communications signals 202U(1)-202U(R) from remote units 206(1)-206(R) serviced by the same cell 204(1)-204(N) into respective combined uplink communications signals 202CU(1)-202CU(N) and distribute such combined uplink communications signals 202CU(1)-202CU(N) to the respective cells 204(1)-204(N). As will be also discussed in more detail below, the selective router circuit 212 in the WDCS 200 is configured to selectively distribute the received remote uplink communications signals 202U(1)-202U(R) from the remote units 206(1)-206(R) that contain data for UE 208(1)-208(R) serviced by the respective remote units 206(1)-206(R). The selectively distributed remote uplink communications signals 202U(1)-202U(R) transmitted by the UEs 208(1)-208(R) from the respective servicing remote units 206(1)-206(R) are then routed to the servicing cell 204(1)-204(N) configured to service such associated remote units 206(1)-206(R). This is opposed to all the cell downlink communications signals 202D(1)-202D(N) for a particular cell 204(1)-204(N) being communicated to each remote unit among the remote units 206(1)-206(R) that is serviced by the particular cell 204(1)-204(N). In this manner, only these selective remote uplink communications signals 202U(1)-202U(R) from the remote units 206(1)-206(R) that contain user data for the servicing cell 204(1)-204(N) configured to service the respective remote units 206(1)-206(R) are combined to be distributed to the cells 204(1)-204(N). Thus, only noise associated with selective remote uplink communications signals 202U(1)-202U(R) are present in the combined remote uplink communications signals 202CU(1)-202CU(N), thus reducing the overall noise in the selective combined uplink communications signals 202CU(1)-202CU(N) for an improved signal-to-noise ratio (SNR), resulting in a lower noise floor.

Figure 5:
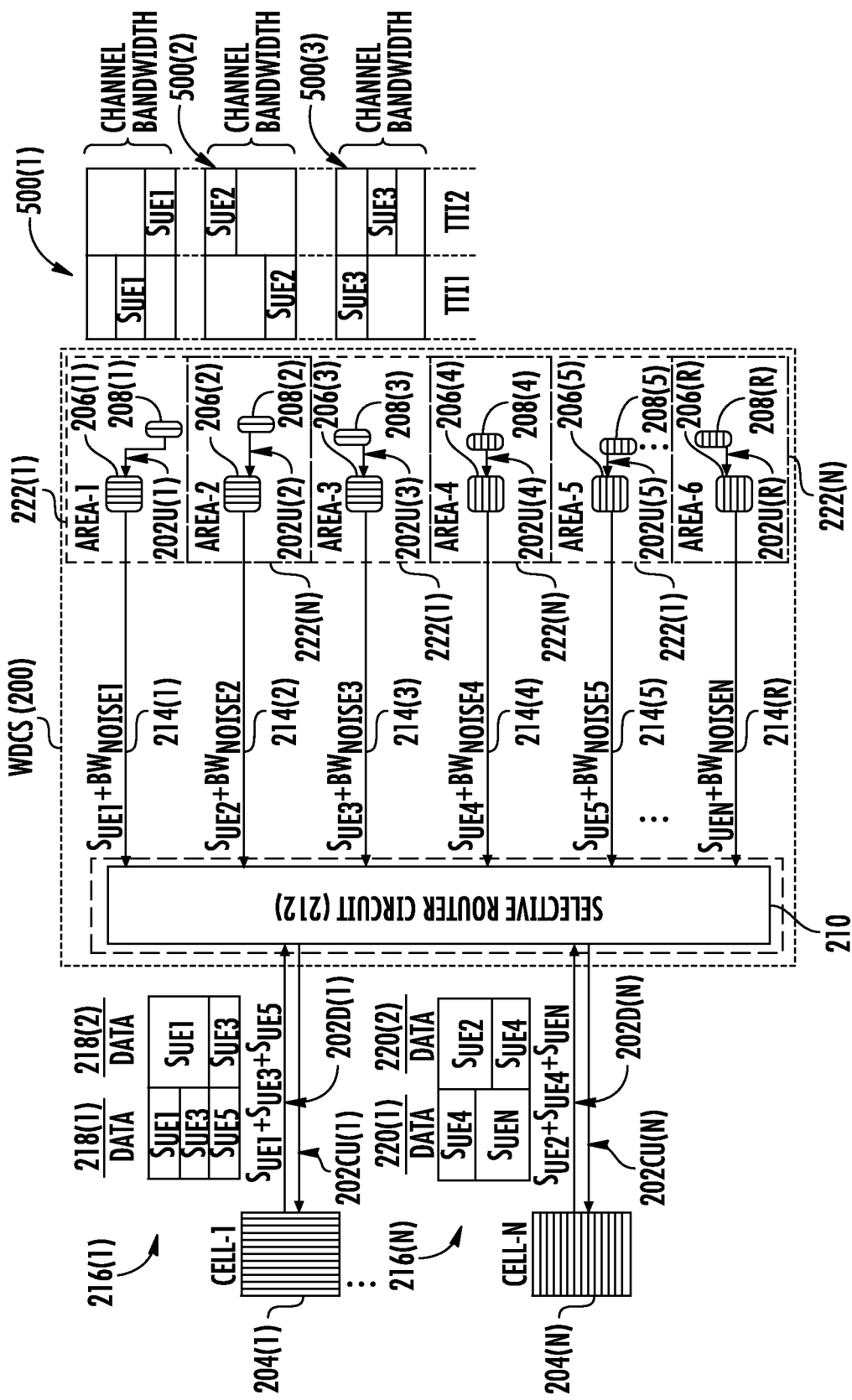
FIG. 5 is a schematic diagram of the non-contiguous WDCS in FIG. 2 configured to selectively receive and combine uplink communications signals that contain UE data from UEs communicating to the remote units, into a combined uplink communications signal, while blocking uplink communications signals not containing UE data so that the noise and/or interference in such blocked signals are not combined with the combined selectively received uplink communications signals to reduce the overall noise in the combined uplink communications signal.

In this regard, FIG. 5 is a schematic diagram of the non-contiguous WDCS 200 in FIG. 2 that illustrates the selective router circuit 212 combining selectively received remote uplink communications signals 202U(1)-202U(R) containing data for a UE 208(1)-208(R) into the combined remote uplink communications signals 202CU(1)-202CU(N). Common elements between the WDCS 200 in FIG. 2 and the WDCS 500 in FIG. 5 are illustrated with common element numbers, and are not re-described. As will be discussed in more detail below, the selective router circuit 212 is configured to selectively block remote uplink communications signals 202U(1)-202U(R) not containing data for a UE 208(1)-208(R) so that the noise and/or interference in such blocked remote uplink communications signals 202U(1)-202U(R) are not combined in the received combined remote uplink communications signals 202CU(1)-202CU(N) to reduce the overall noise in the combined remote uplink communications signals 202CU(1)-202CU(N).

With reference to FIG. 5, a radio subframe 500(1) of the remote uplink communications signal 202U(1) transmitted by UE 208(1) to remote unit 206(1) includes user data for UE 208(1) occupying subcarrier set $S_{UE1}$ of radio resources comprising one or more subcarriers for cell 204(1). Radio subframe 500(3) of the remote uplink communications signal 202U(3) transmitted by UE 208(3) to remote unit 206(3) includes user data for UE 208(3) occupying subcarrier set $S_{UE3}$ of radio resources comprising one or more subcarriers for cell 204(1). The distribution of each subcarrier set $S_{UE1}$, $S_{UE3}$, SUES may include associated bandwidth noise $BW_{NOISE1}$, $BW_{NOISE3}$, $BW_{NOISE5}$ in the frequency band of the cell 204(1) that may be outside the bandwidth of the respective subcarrier sets $S_{UE1}$, $S_{UE3}$, SUES even if only subcarrier sets $S_{UE1}$, $S_{UE3}$, SUES contain user data from the respective UEs 208(1), 2028(3), 208(5). The selective router circuit 212 is configured to combine the remote uplink communications signals 202U(1), 202U(3), 202U(5) containing subcarrier sets $S_{UE1}$, $S_{UE3}$, SUES into the combined uplink communications signal 202CU(1). In this example, rather than the distributed remote uplink communications signals 202U(1), 202U(3), 202U(5) each passing the entire bandwidth of the cell 204(1), the subcarriers that are outside of the respective subcarrier sets $S_{UE1}$, $S_{UE3}$, $S_{UE5}$ are selectively blocked from respective remote uplink communications signal 202U(1), 202U(3), 202U(5) so that noise from subcarriers not associated with user data is not included in the combined uplink communications signal 202CU(1). The selective blocking of the subcarriers not associated with user data in the respective remote uplink communications signal 202U(1), 202U(3), 202U(5) can be performed in the remote units 206(1), 206(3), 206(5) or the selective router circuit 212, as examples. This is opposed to, for example, the alternative contiguous WDCS 300 in FIG. 6 that distributes the subcarrier sets $S_{UE1}$, $S_{UE3}$, $S_{UE5}$ and associated bandwidth noise $BW_{NOISE-CELL1}$ over the frequency bandwidth of cell 204(1) over each communications link 214(1), 214(3), 214(5).

Similarly, with reference back to the WDCS 200 in FIG. 5, a radio subframe 500(2) of the remote uplink communications signal 202U(2) transmitted by UE 208(2) to remote unit 206(2) includes user data for UE 208(2) occupying subcarrier set $S_{UE2}$ of radio resources comprising one or more subcarriers for cell 204(2). Remote uplink communications signal 202U(4) transmitted by UE 208(4) to remote unit 206(4) can include user data for UE 208(4) occupying subcarrier set $S_{UE4}$ of radio resources comprising one or more subcarriers for cell 204(2). Remote uplink communications signal 202U(R) transmitted by UE 208(R) to remote unit 206(R) can include user data for UE 208(R) occupying subcarrier set $S_{UEN}$ of radio resources comprising one or more subcarriers for cell 204(2). The distribution of each subcarrier set $S_{UE2}$, $S_{UE4}$, $S_{UE6}$ may include associated bandwidth noise $BW_{NOISE2}$, $BW_{NOISE4}$, $BW_{NOISEN}$ in the frequency band of the cell 204(2) that may be outside the bandwidth of the respective subcarrier sets $S_{UE2}$, $S_{UE4}$, $S_{UE6}$, even though subcarrier sets $S_{UE2}$, $S_{UE4}$, $S_{UE6}$ only contain user data from the respective UEs 208(2), 208(4), 208(R). The selective router circuit 212 is configured to combine the remote uplink communications signals 202U (2), 202U(4), 202U(R) containing respective subcarrier sets $S_{UE2}$, $S_{UE4}$, $S_{UE6}$ into the combined uplink communications signal 202CU(N). In this example, rather than the distributed remote uplink communications signals 202U(2), 202U(4), 202U(R) each passing the entire bandwidth of the cell 204(2), the subcarriers that are outside of the respective subcarrier sets $S_{UE2}$, $S_{UE4}$, $S_{UE6}$ are selectively blocked from respective remote uplink communications signal 202U (2), 202U(4), 202U(R) so that noise from subcarriers not associated with user data is not included in the combined uplink communications signal 202CU(N). The selective blocking of the subcarriers not associated with user data in the respective remote uplink communications signal 202U (2), 202U(4), 202U(R) can be performed in the remote units 206(2), 206(4), 206(R) or the selective router circuit 212, as examples. This is opposed to, for example, the alternative contiguous WDCS 300 in FIG. 6 that distributes the subcarrier sets $S_{UE2}$, $S_{UE4}$, $S_{UE6}$ and associated bandwidth noise $BW_{NOISE-CELL2}$ over the frequency bandwidth of cell 204(2) over each communications link 214(2), 214(4), 214(R).

As discussed above, the WDCS 200 in FIGS. 2 and 5 is configured to selectively distribute the cell downlink and/or remote uplink communications signals 202D(1)-202D(N), 202U(1)-202U(R) to conserve transmit power and/or to reduce noise. In one example, in order to decide which cell downlink and remote uplink communications signals 202D (1)-202D(N), 202U(1)-202U(R) should be selectively distributed, it is determined which UEs 208(1)-208(R) for each remote unit cluster 222(1), 222(2) are communicating to which remote units 206(1)-206(R). This allows a determination of which subcarrier sets $S_{UE1}$-$S_{UEN}$ in the cell downlink and/or remote uplink communications signals 202D(1)-202D(N), 202U(1)-202U(R) would include user data for the UEs 208(1)-208(R) and which subcarrier sets $S_{UE1}$-$S_{UEN}$ do not, if the assignment of the subcarrier sets $S_{UE1}$-$S_{UEN}$ to UEs 208(1)-208(R) is known and/or can be determined for selective routing decisions.

In one example, to be able to identify which remote units 206(1)-206(R) are associated with particular UEs 208(1)-208(R), to then selectively distribute and/or receive the cell downlink and/or remote uplink communication signals 202D(1)-202D(N), 202U(1)-202U(R), the WDCS 200 in FIG. 2 is configured as a non-contiguous WDCS. A non-contiguous WDCS is a WDCS in which the remote units are clustered such that remote units with contiguous (i.e., adjacent, neighbor) coverage areas receive downlink communications signals serviced by different cells to provide non-contiguous cell coverage areas. For example, taking the example of the WDCS 200 in FIG. 2, remote unit 206(1) is configured to receive cell downlink communication signals 202D(1) for cell 204(1), wherein an adjacent, neighbor remote unit 206(2) is configured to receive cell downlink communications signals 202D(2) from a different cell 204 (2). Thus, when the UE 208(1) moves from the remote coverage area of the remote unit 206(1) in the WDCS 200 to the adjacent remote coverage area of the neighbor remote unit 206(2), the UE 208(1) will request to be serviced by the different cell 204(2) servicing the neighbor remote unit 206(2) instead of from the same cell 204(1). This enables the WDCS 200 to avoid ambiguity in identifying which remote units 206(1)-206(R) service a particular UE 208(1)-208(R) since the UE 208(1)-208(R) moving to a neighbor remote unit will trigger establishing communications with a different cell as opposed to a handoff to the same cell. In a contiguous WDCS, a UE moving from one remote unit to a neighbor remote unit both servicing the same cell may result in a handoff process that may not trigger the cell to be notified of change in remote unit serving the UE.

Figure 7:
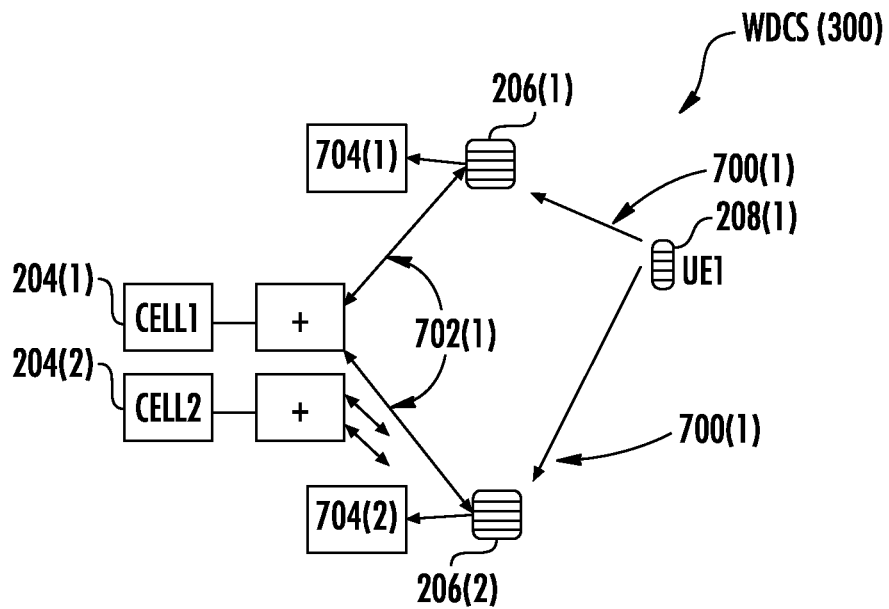
FIG. 7 is a schematic diagram of a contiguous WDCS illustrating the broadcasting of systems information block (SIB) messages from the cells to UE through associated remote units, and the UE communicating the accessed cell to its associated remote unit.

In this regard, FIG. 7 is a schematic diagram of an example case of the contiguous WDCS 300 in FIG. 3 illustrating the broadcasting of systems information block (SIB) messages from the cells 204(1), 204(2) to UE 208(1) through associated remote units 206(1), 206(2), and the UE 208(1) communicating the accessed cell 204(1), 204(2) to its associated respective remote unit 206(1), 206(2). In this example, the physical random access channel (PRACH) message that is advertised by a SIB by the cells 204(1), 204(2) to the remote units 206(1), 206(2) includes attributes that are unique to the cell 204(1), 204(2). A PRACH message includes attributes which makes it unique to the cell it is sent to. These attributes include different locations of the PRACH in terms of frequency and time as well as the root sequence index that the preamble was derived from. The cell unique attributes are advertised through the System Information Block #2 (SIB #2) in the SIB message transmitted by each of the cells. A UE chooses the cell it wants to access and determines the PRACH attributes for accessing this cell, based on the attributes received from the cell through SIB #2 in the SIB message. Thus, the PRACH message can be analyzed to determine to which cell 204(1), 204(2), a remote unit 206(1), 206(2) is assigned to then determine which subcarrier sets in the cell downlink and/or remote uplink communication signals 202D(1)-202D(N), 202U(1)-202U (R) from the remote unit 206(1), 206(2) may and will not contain user data for selective routing and/or distribution decisions. A detailed description of the PRACH unique attributes and the Random Access process are described at the 3GPP documents TS 36.321 and TS 36.213, which can be found at https://portal.3pp.org/desktopmodules/Specifications/SpecificationDetails.aspx?specificationId=2437 and https://portal.3gpp.org/desktopmodules/Specifications/SpecificationDetails.aspx?specificationId=2427, and which are incorporated herein by reference in their entireties.

In this regard, as shown in the example case in FIG. 7, remote units 206(1), 206(2) are coupled to the same cell 204(1) and therefore transmit the same SIB #2 message 700(1). UE 208(1) will access the network using the PRACH attributes advertised by the SIB #2 message 700(1) from the cell 204(1) and might be received by both remote units 206(1), 206(2). Since both remote units 206(1), 206(2) are coupled to cell 204(1), PRACH analyzers 704(1), 704(2) coupled to both remote units 206(1), 206(2) can be "tuned" to the same PRACH attributes. The PRACH analyzers 704(1), 704(2) being coupled to the respective remote units 206(1), 206(2) are able to identify PRACH messages 702(1) that have attributes of cell 204(1) in this example. Therefore, both remote units 206(1), 206(2) will identify the UE 208(1) access attempt to the cell 204(1). As a result, an ambiguity is created since the UE 208(1) cannot be related to a unique remote unit 206(1), 206(2). Processing two signals received by remote units 206(1), 206(2) by two independent PRACH analyzers 704(1), 704(2), that are coupled to the same cell 204(1), but assisted by power and time of arrival measurements, could theoretically reduce ambiguity, but may practically will lead to very high false decision in indoor environment.

Figure 8:
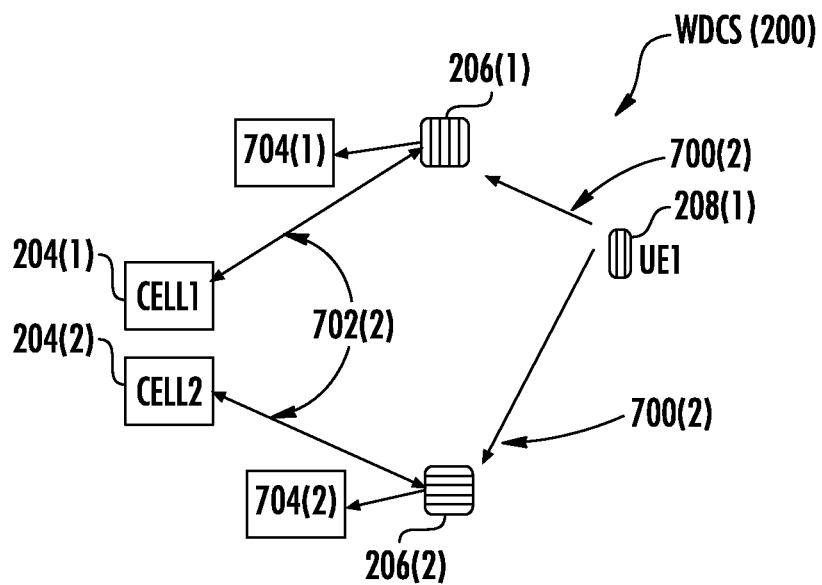
FIG. 8 is a schematic diagram of a non-contiguous WDCS illustrating the broadcasting of SIB messages from the cells to UE through associated remote units, and the UE communicating the accessed cell to its associated remote unit such that UE serviced by a cell from its associated remote unit can be distinguished from other UE serviced by a different cell from a neighboring remote unit.

FIG. 8 is a schematic diagram of the non-contiguous WDCS 200 in FIG. 2 illustrating the broadcasting of SIB messages from the cells 204(1), 204(2) to the UE 208(1)

through remote units 206(1), 206(2) at different times. Although the SIB messages 700(2) from the cells 204(1), 204(2) might be received at both remote units 206(1), 206(2), the PRACH analyzers 704(1), 704(2) analyzing the PRACH messages 702(2) from each remote unit 206(1), 206(2) is "tuned" to identify only PRACH messages 702(2) that have the attributes of the cell 204(1), 204(2) it is connected to. In this example, the PRACH analyzer 704(1) coupled to remote unit 206(1) is tuned to identify PRACH messages 702(2) that uses cell 204(1) attributes. The PRACH analyzer 704(2) coupled to the remote unit 206(2) is tuned to identify PRACH messages 702(2) that uses cell 204(2) attributes. Thus, only the PRACH analyzer 704(1) coupled to remote unit 206(1) will identify the PRACH messages 702(2) sent by UE 208(1) when it uses the PRACH attributes for cell 204(1) it is "tuned" to. Only the PRACH analyzer 704(2) coupled to remote unit 206(2) will identify the PRACH messages 702(2) since it uses the PRACH attributes "tuned" to cell 204(2). As a result, ambiguity is avoided in identifying and associated the UE 208(1) to a unique remote unit 206(1), 206(2) in which the UE 208(1) is being serviced by its selection of cell 204(1), 204(2) resulting from the SIB messages.

Figure 6:
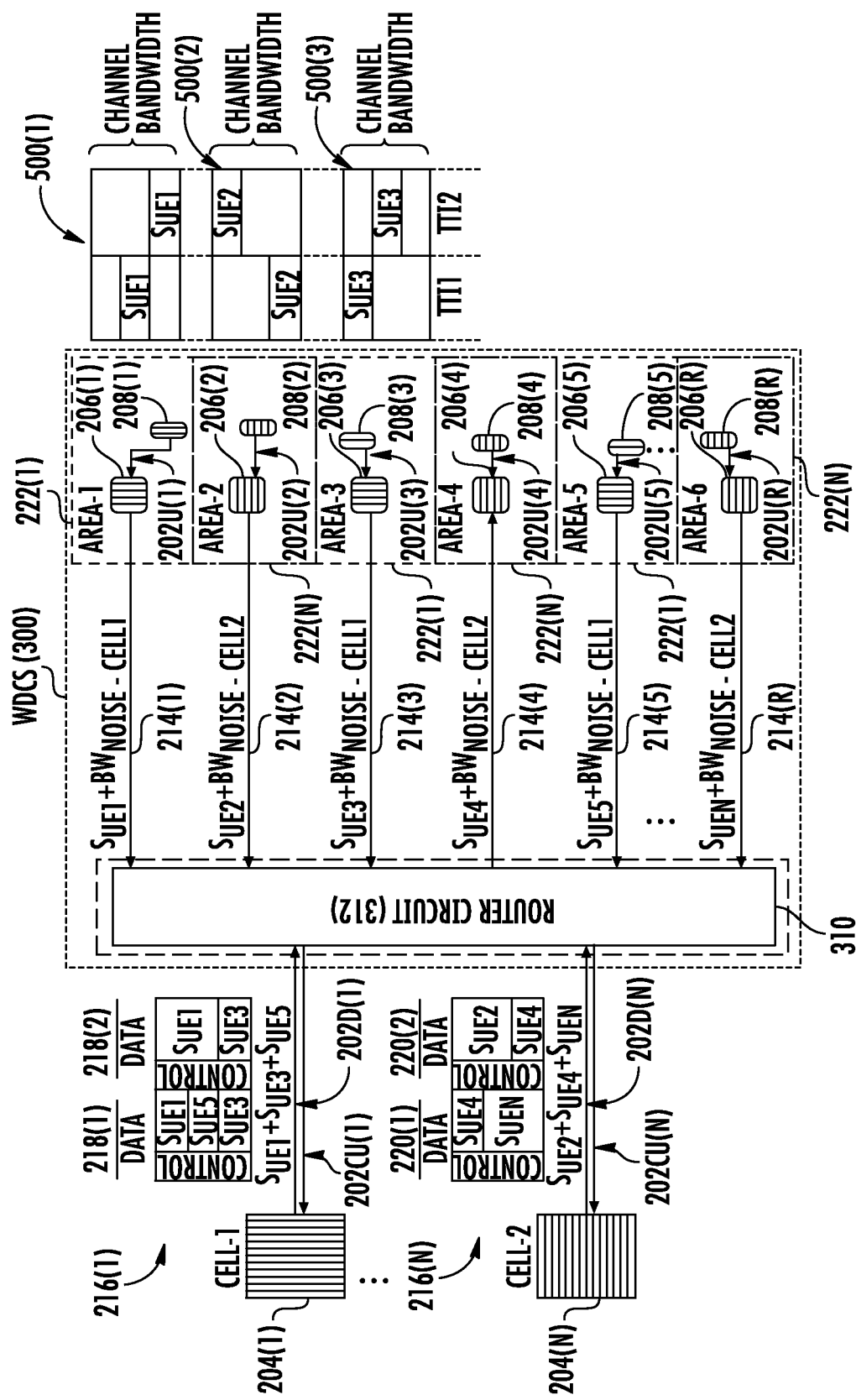
FIG. 6 is a schematic diagram of the contiguous WDCS in FIG. 3 configured to combine uplink communications signals received from all remote units into a combined uplink communications signal, wherein the combined uplink communications signal includes the aggregated noise from the individual uplink communications signals.
Figure 9:
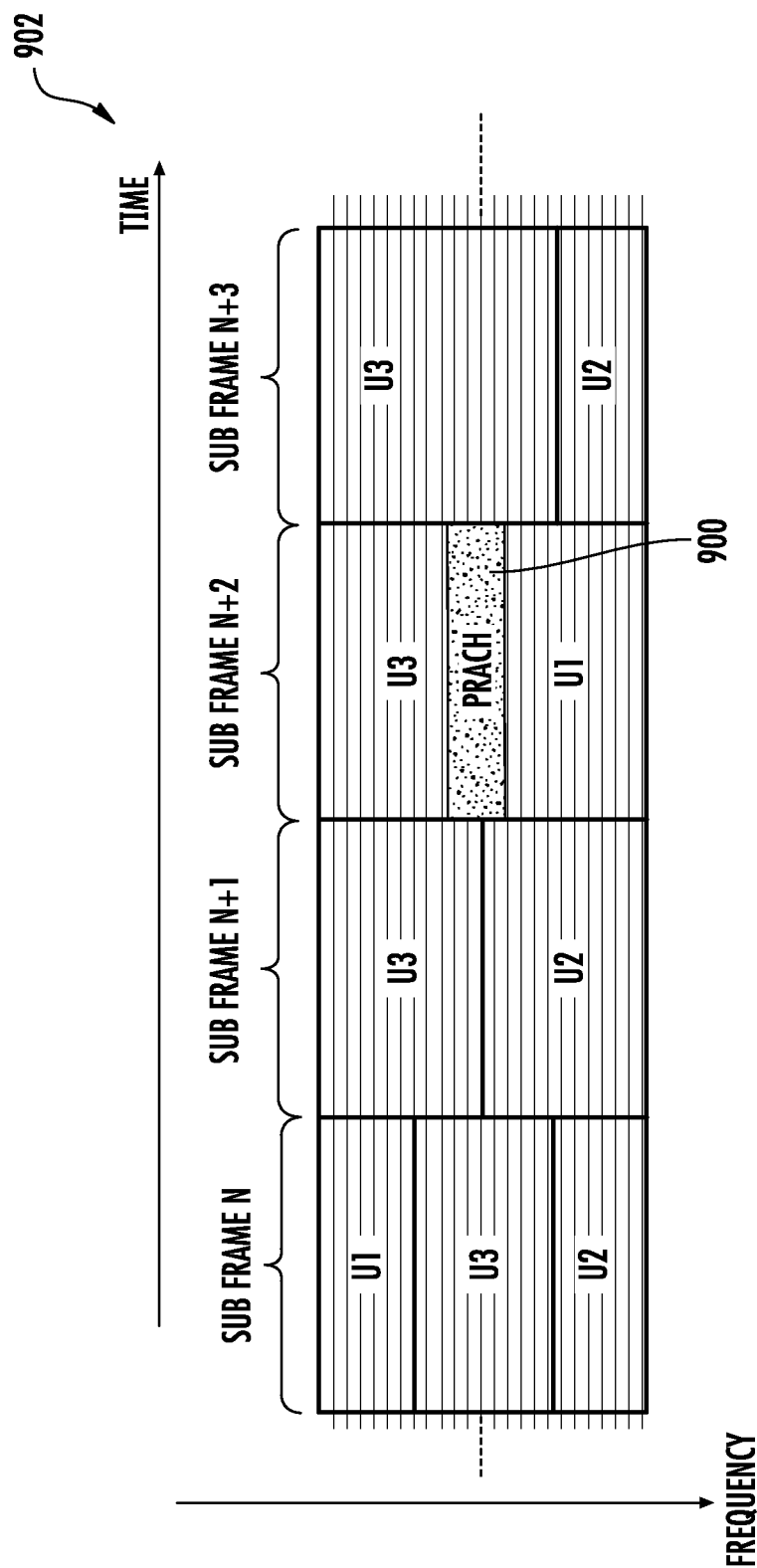
FIG. 9 is a schematic diagram of a physical random access channel (PRACH) included in a communication sub-frame indicating an allocation of radio resources for a cell.

One process that can enable a UE 208(1)-208(R) in the WDCS 200 in FIGS. 2 and 6 is called "random access." In a starting point of this process, a UE 208(1)-208(R) is not known to a cell 204(1)-204(N). Dedicated radio resources are allocated by a serving cell 204(1)-204(N) to a UE 208(1)-208(R) for communicating with the serving cell 204(1)-204(N). To enable new UE 208(1)-208(R) to join the serving cell 204(1)-204(N) service, the serving cell 204(1)-204(N) allocates a group of radio resources which are a PRACH in this example, as illustrated in FIG. 9. FIG. 9 is a schematic diagram of a PRACH 900 included in a communication frame 902 indicating an allocation of radio resources for a serving cell 204(1)-204(N). The location of the PRACH 900 is transmitted by a broadcast control channel of the serving cell 204(1)-204(N) to allow a UE 208(1)-208(R) to know which radio resources to use for communicating with the serving cell 204(1)-204(N) when the UE 208(1)-208(R) first accesses the serving cell 204(1)-204(N). To minimize the probability of collisions between UE 208(1)-208(R) targeting the same serving cell 204(1)-204(N) (i.e., the same PRACH 900 in the communication frame 902 at the same time, a code division multiplexing mechanism can be used, enabling the process to distinguish between multiple UEs 208(1)-208(R) that access the same serving cell 204(1)-204(N) at the same time, but with different access codes. The information required for the random access is broadcasted by the serving cell 204(1)-204(N) in RACH messages. The RACH messages include attributes which enable distinguishing the sending serving cell 204(1)-204(N) from the other serving cells 204(1)-204(N) at its proximity. This avoids the situation of a UE 208(1)-208(R) using the RACH process causing a mistaken response to a neighbor serving cells 204(1)-204(N). These attributes can include different location of the PRACH in terms of frequency and time as well as the root index that the preamble was derived from. The RACH attributes are advertised through SIB #2 message transmitted by each of the serving cells 204(1)-204(N). A UE 208(1)-208(R) chooses the serving cell 204(1)-204(N) it wants to access and determines the RACH attributes for accessing this serving cell 204(1)-204(N), based on the attributes received from the serving cells 204(1)-204(N) through SIB #2 message. A detailed description of the PRACH unique attributes and this random access process are described at the previously referenced 3GPP documents TS 36.321 and TS 36.213.

Figure 10A:
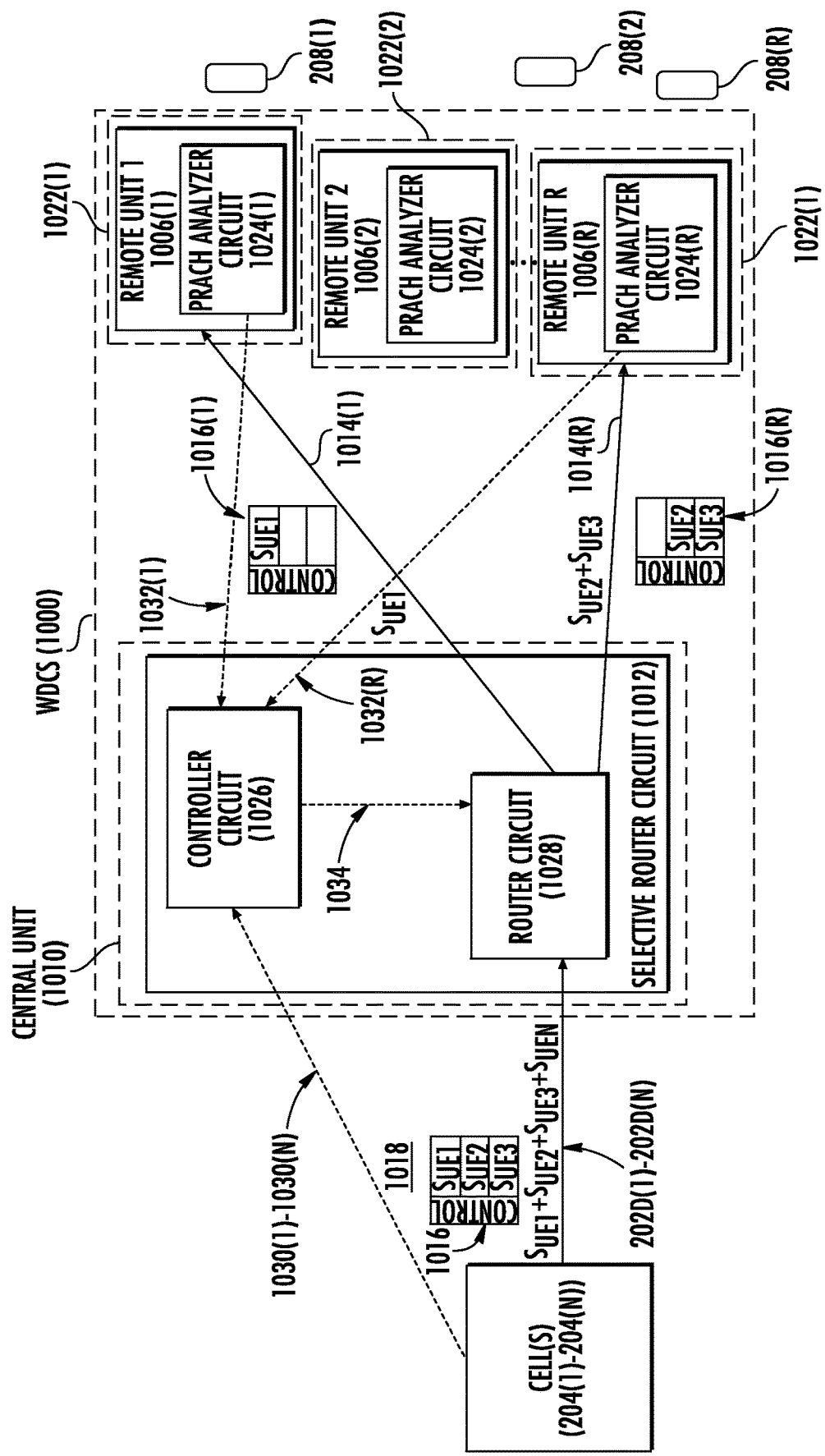
FIG. 10A is a schematic diagram of another exemplary non-contiguous WDCS that includes a selective router circuit configured to selectively distribute cell downlink communications signals to the remote units, based on information received by PRACH analyzer circuits each associated with a remote unit and configured to analyze received PRACH messages indicating the cell serviced by the UE associated with the remote unit.

FIG. 10A is a schematic diagram of another exemplary non-contiguous WDCS 1000 that includes a selective router circuit 1012 configured to selectively distribute cell downlink communications signals 202D(1)-202D(N) over communications links 1014(1)-1014(R) to remote units 1006(1)-1006(R), based on information received by PRACH analyzer circuits 1024(1)-1024(R) each associated with a respective remote unit 1006(1)-1006(R). Common elements between the WDCS 200 in FIG. 2 and the WDCS 1000 in FIG. 10A are shown with common element numbers and will not be re-described herein. As discussed below, the selective router circuit 1012 in the WDCS 1000 can receive information from a cell 204(1)-204(N) indicating assignment of subcarrier sets $S_{UE1}$-$S_{UEN}$ to UEs 208(1)-208(R). The PRACH analyzer circuits 1024(1)-1024(R) are configured to analyze the cell downlink communications signals 202D(1)-202D(N) to determine the assignment of the UEs 208(1)-208(R) to the remote units 1006(1)-1006(R) in a given remote unit cluster 1022(1), 1022(2). This information regarding the assignment of subcarrier sets $S_{UE1}$-$S_{UEN}$ to which UEs 208(1)-208(R), and the assignment of the UEs 208(1)-208(R) to the remote units 1006(1)-1006(R) can then be used by the selective router circuit 1012 to determine which of the subcarrier sets $S_{UE1}$-$S_{UEN}$ in a given downlink radio subframe of a downlink radio frame 1016(1)-1016(R) are assigned to which remote unit 1006(1)-1006(R) among a plurality of non-contiguous remote units 1006(1)-1006(R) in a given remote unit cluster 1022(1), 1022(2). The selective router circuit 1012 can then selectively distribute the subcarrier sets $S_{UE1}$-$S_{UEN}$ to their assigned remote units 1006(1)-1006(R) based on the determined subcarrier set $S_{UE1}$-$S_{UEN}$ to remote unit 1006(1)-1006(R) assignment.

Note that in the example WDCS 1000 in FIG. 10A, only two remote unit clusters 1022(1), 1022(2) are shown, wherein non-contiguous remote units 1006(1), 1006(R) are in remote unit cluster 1022(1), and remote unit 1006(2) is in remote unit cluster 1022(2). However, note that more than two remote unit clusters could be provided as long as the remote units 1006(1)-1006(R) belonging to the same remote unit cluster are non-contiguously disposed to each other. Also note that in this example, separate PRACH analyzer circuits 1024(1)-1024(R) are provided corresponding to each respective remote unit 1006(1)-1006(R). However, note that a PRACH analyzer circuit(s) could also alternatively be provided in a central unit 1010 to determine the assignment of the UEs 208(1)-208(R) to the remote units 1006(1)-1006(R) in a given remote unit cluster 1022(1), 1022(2).

With reference to FIG. 10A, in this example, the selective router circuit 1012 in the WDCS 1000 includes a controller circuit 1026 and a router circuit 1028. The controller circuit 1026 and the router circuit 1028 of the selective router circuit 1012 are configured to selectively distribute the cell downlink communications signal 202D(1)-202D(N) received from respective cell 204(1)-204(N)) to remote units 206(1)-206(R) to be distributed to UE 208(1)-208(R) identified as servicing the respective UEs 208(1)-208(R) according to an exemplary process 1100 in FIG. 11. In this regard, the router circuit 1028 is configured to receive the cell downlink communications signal 202D(1)-202D(N) from the cell 204(1) and any other cells present (block 1102 in FIG. 11). As previously discussed in the WDCS 200 in FIG. 2, using cell 204(1) and the first remote unit cluster 222(1) as an example, the cell downlink communications signal 202D(1) includes one or more subcarrier sets SUE transmitted by the cell 204(1), which include subcarrier sets $S_{UE1}$-$S_{UE3}$ in the downlink radio subframe 1018 of radio frame 1016 shown in FIG. 10A. The controller circuit 1026 is configured to receive a subcarrier assignment indicator 1030(1)-1030(N) from the cells 204(1)-204(N) indicating the assignment of subcarrier sets $S_{UE1}$-$S_{UEN}$ to the UEs 208(1)-208(R) (block 1104 in FIG. 11). The controller circuit 1026 is also configured to determine the assignment of the UEs 208(1)-208(R) to the non-contiguous remote units 206(1)-206(R) in the remote unit cluster 1022(1) (block 1106 in FIG. 11). In this example, the controller circuit 1026 is configured to determine the assignment of the UEs 208(1)-208(R) to the non-contiguous remote units 206(1)-206(R) in the remote unit cluster 1022(1) by being configured to receive a UE assignment indicator 1032(1)-1032(R) from each respective remote unit 1006(1)-1006(R) indicating the assignment of UEs 208(1)-208(R) to particular remote units 1006(1)-1006(R) that the UEs 208(1)-208(R) are being serviced through for communications. In this example, the PRACH analyzer circuits 1024(1)-1024(R) are each configured to determine the assignment of UEs 208(1)-208(R) to particular remote units 1006(1)-1006(R) by being configured analyze a PRACH channel in the remote uplink communications signals 202U(1)-202U(R) to identify the one or more UEs 208(1)-208(R) assigned to each remote unit 206(1)-206(R) as previously described.

Figure 11:
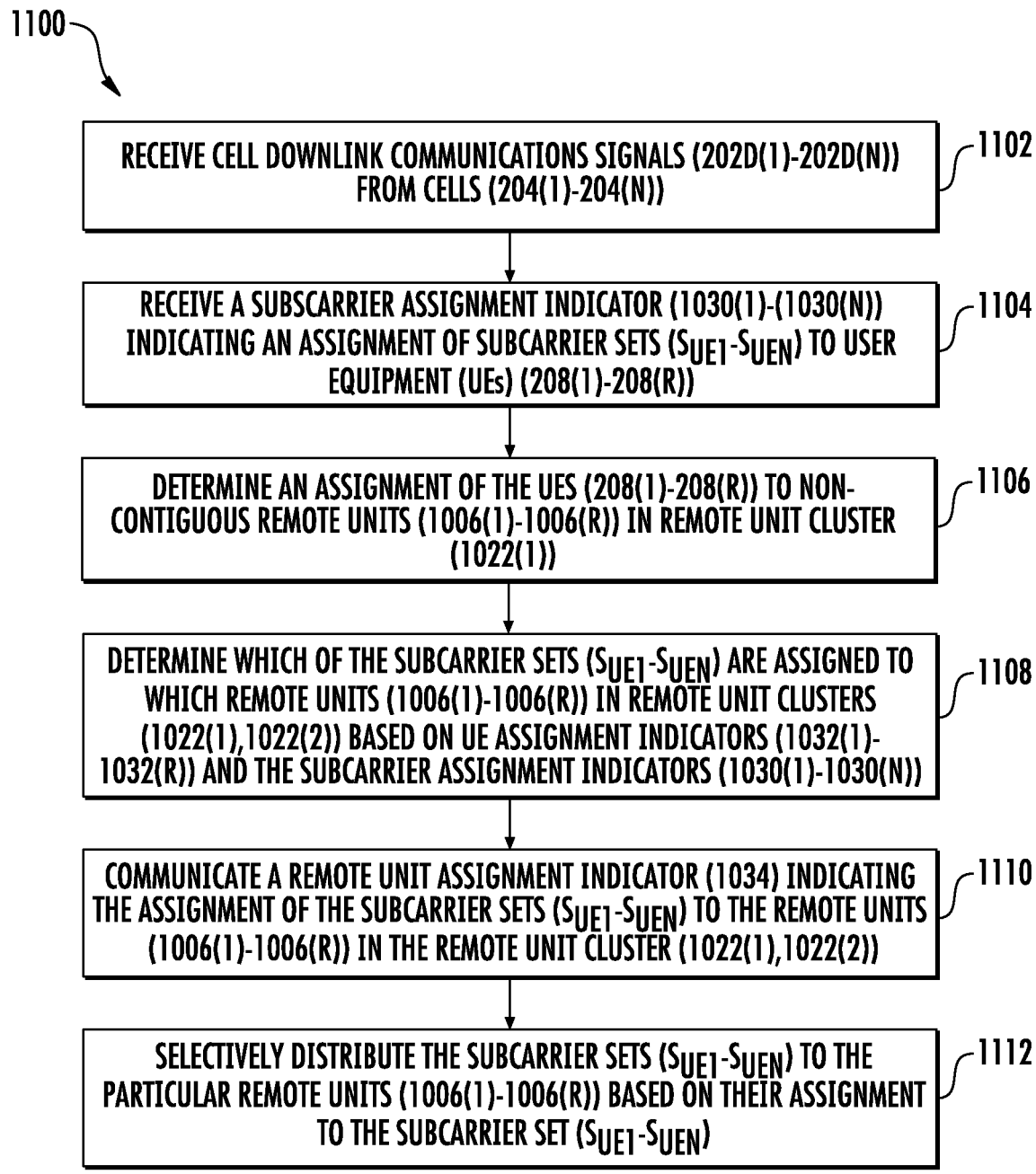
FIG. 11 is a flowchart illustrating an exemplary process of the non-contiguous WDCS in FIGS. 2 and/or 10A of selectively distributing downlink communications signals to UE from a cell identified as servicing the UE for reducing downlink transmission power.

With continuing reference to FIG. 10A, the controller circuit 1026 is then configured to determine which of the subcarrier sets $S_{UE1}$-$S_{UEN}$ are assigned to which remote units 206(1)-206(R) in the remote unit clusters 1022(1), 1022(2) based on the UE assignment indicators 1032(1)-1032(R) and the subcarrier assignment indicators 1030(1)-1030(N) (block 1108 in FIG. 11). The controller circuit 1026 is then configured to communicate a remote unit assignment indicator 1034 indicating the assignment of the subcarrier sets $S_{UE1}$-$S_{UEN}$ to the remote units 206(1)-206(R) in the remote unit clusters 1022(1), 1022(2) to the router circuit 1028 (block 1110 in FIG. 11). This enables the router circuit 1028 to use the information in the received remote unit assignment indicator 1034 to selectively distribute the subcarrier sets $S_{UE1}$-$S_{UEN}$ to the particular remote units 206(1)-206(R) based on their assignment to the subcarrier sets $S_{UE1}$-$S_{UEN}$ (block 1112 in FIG. 11). To selectively route, the router circuit 1028 may be configured to selectively block distribution of subcarrier sets $S_{UE1}$-$S_{UEN}$ to the remote units 206(1)-206(R) to which they are not assigned.

Note that the WDCS 1000 in FIG. 10A can perform the above discussed elective routing of selective distribution of the cell downlink communications signal 202D(1)-202D(N) from any number of respective cells 204(1)-204(N)) to any number of corresponding remote unit clusters, including remote unit clusters 1022(1)-1022(N).

Figure 10B:
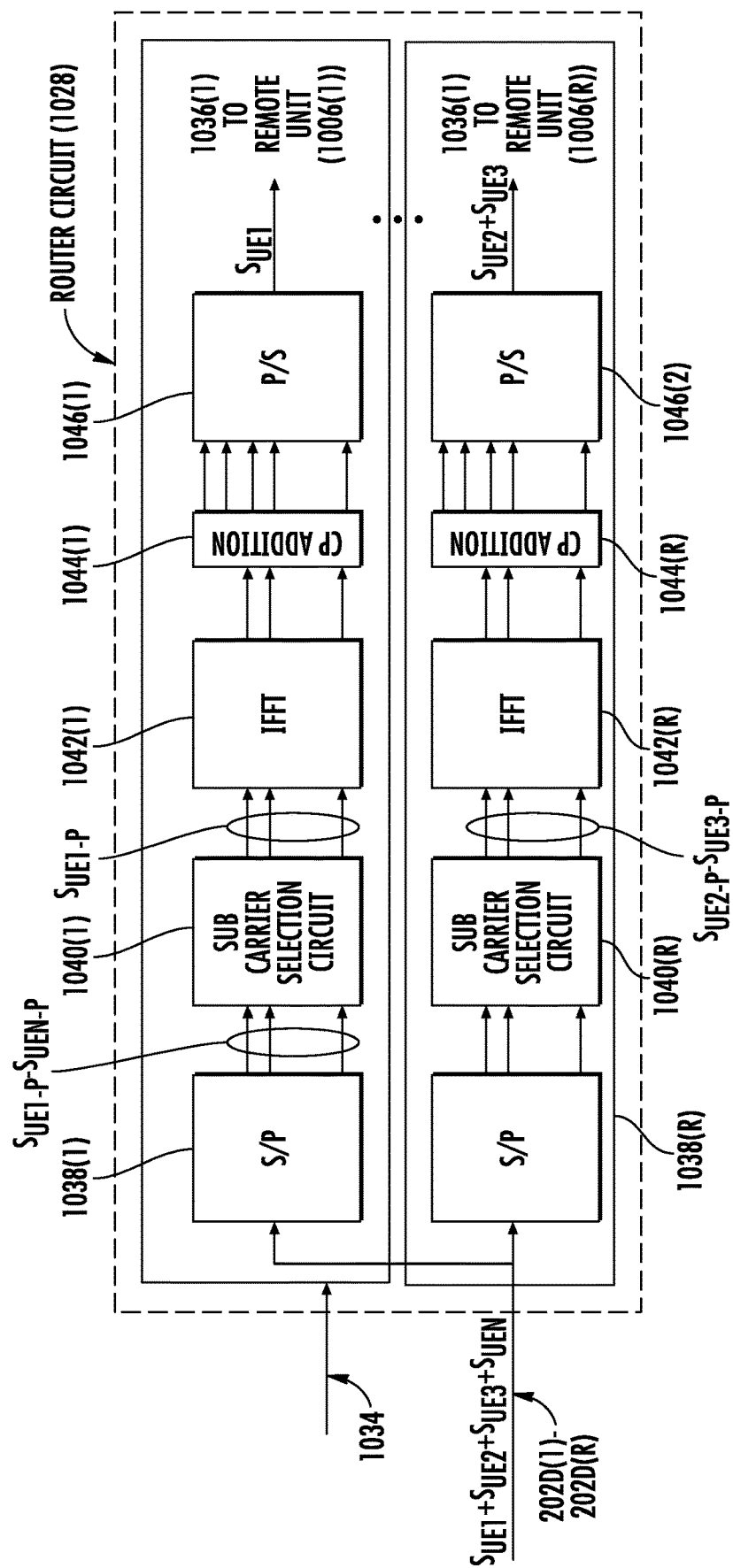
FIG. 10B is a schematic diagram illustrating more exemplary details of the downlink path components of a router circuit in the selective router circuit in FIG. 10A.

FIG. 10B is a schematic diagram illustrating more exemplary details of the downlink path components of the router circuit 1028 in the selective router circuit 1012 in the WDCS 1000 in FIG. 10A. In this example, the router circuit 1028 includes a plurality of downlink subcarrier processing circuits 1036(1)-1036(R) each communicatively coupled to a remote unit 206(1)-206(R) to process the subcarrier sets $S_{UE1}$-$S_{UEN}$ in the received cell downlink communications signals 202D(1)-202D(N). Each downlink subcarrier processing circuit 1036(1)-1036(R) includes a respective serial-to-parallel (S/P) conversion circuit 1038(1)-1038(R) configured to convert the subcarrier sets $S_{UE1}$-$S_{UEN}$ in the cell downlink communications signals 202D(1)-202D(N) to a plurality of parallel subcarriers sets $S_{UE1\text{-}P}$-$S_{UEN\text{-}P}$. Each downlink subcarrier processing circuit 1036(1)-1036(R) also includes a subcarrier selection circuit 1040(1)-1040(R) configured to pass the parallel subcarrier sets $S_{UE1\text{-}P}$-$S_{UEN\text{-}P}$ based on the remote unit assignment indicator 1034. In this example, the remote unit assignment indicator 1034 indicates that subcarrier set $S_{UE1}$ is assigned to remote unit 206(1), and subcarrier sets $S_{UE2}$, SUES are assigned to remote unit 206(R) as also shown in FIG. 10A. Thus, the subcarrier selection circuit 1040(1) passes parallel subcarrier set $S_{UE1\text{-}P}$ and subcarrier selection circuit 1040(R) passes parallel subcarrier sets $S_{UE2\text{-}P}$, $S_{UE3\text{-}P}$ in this example. For example, subcarrier selection circuits 1040(1)-1040(R) may be configured to zero out one or more parallel subcarrier sets $S_{UE1\text{-}P}$, $S_{UEN\text{-}P}$ not assigned to its respective remote unit 206(1)-206(R) based on the remote unit assignment indicator 1034 to then effectively pass the assigned parallel subcarrier sets $S_{UE2\text{-}P}$-$S_{UE3\text{-}P}$. Each downlink subcarrier processing circuit 1036(1)-1036(R) also includes a Fourier filter circuit 1042(1)-1042(R) configured to filter the passed parallel subcarrier sets $S_{UE1\text{-}P}$-$S_{UEN\text{-}P}$ to a cyclic prefix (CP) addition circuit 1044(1)-1044(R) configured to add a CP to each passed one or more parallel subcarrier sets $S_{UE1\text{-}P}$-$S_{UEN\text{-}P}$. Each downlink subcarrier processing circuit 1036(1)-1036(R) also includes a respective parallel-to-serial (P/S) conversion circuit 1046(1)-1046(R) configured to convert the passed one or more parallel subcarrier sets $S_{UE1\text{-}P}$-$S_{UE3\text{-}P}$ back to serial subcarrier sets $S_{UE1}$-$S_{UE3}$ to be distributed to the remote units 206(1)-206(R).

Figure 12A:
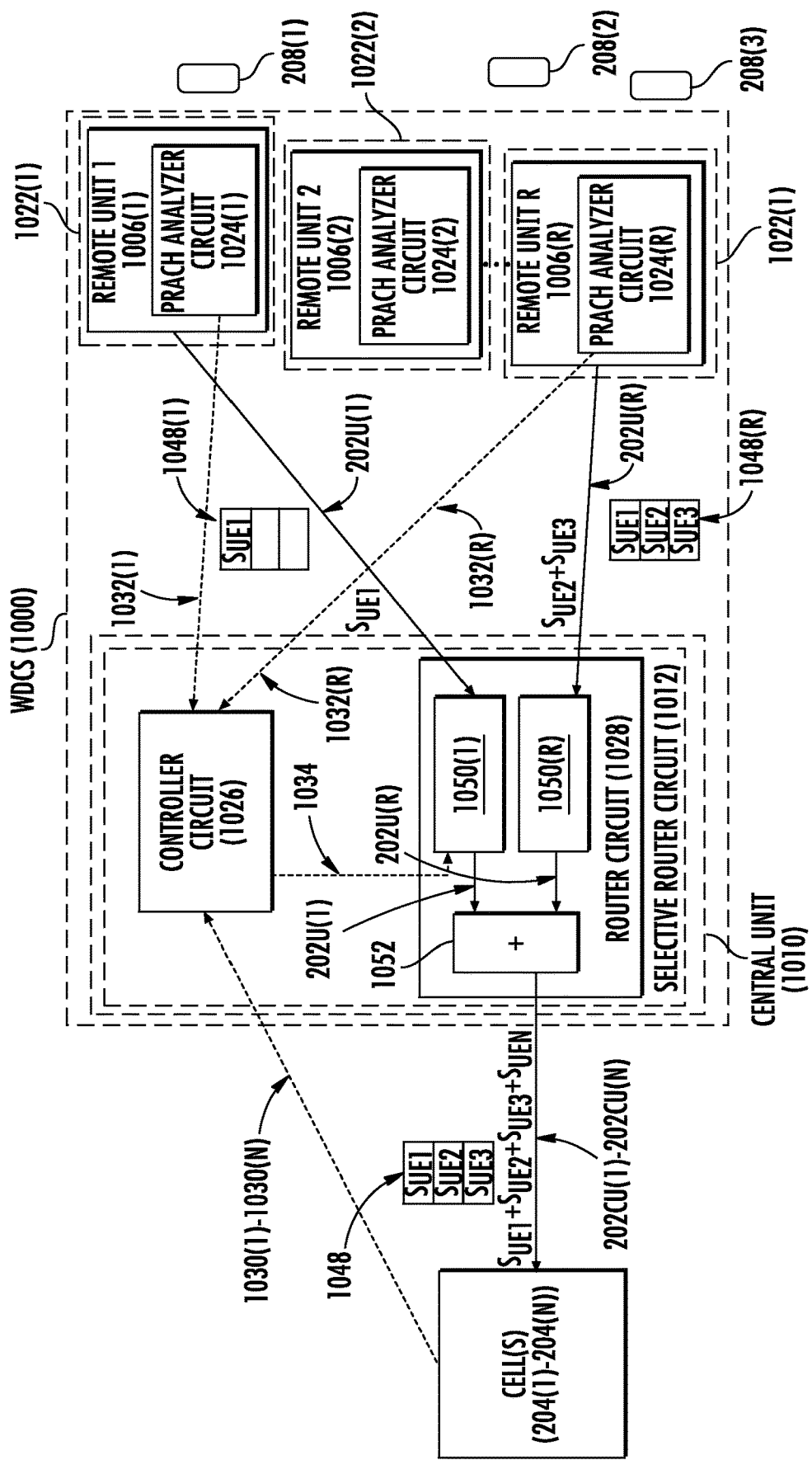
FIG. 12A is a schematic diagram of the non-contiguous WDCS in FIG. 10A wherein the selective router circuit is configured to selectively distribute uplink communications signals to the remote units, based on information received by PRACH analyzer circuits each associated with a remote unit and configured to analyze received PRACH messages indicating the cell serviced by the UE associated with the remote unit.

FIG. 12A is a schematic diagram of another exemplary non-contiguous WDCS 1000 that includes a selective router circuit 1012 configured to selectively distribute remote uplink communications signals 202U(1)-202U(R) from the remote units 1006(1)-1006(R) to the cells 204(1)-204(N) based on information received by the PRACH analyzer circuits 1024(1)-1024(R) each associated with a respective remote unit 1006(1)-1006(R). Common elements between the WDCS 200 in FIG. 5 and the WDCS 1000 in FIG. 12A are shown with common element numbers. Note that the selective router circuit 1012 can be configured to selectively distribute the remote uplink communications signals 202U(1)-202U(R) from the remote units 1006(1)-1006(R) to the cells 204(1)-204(N), selectively distribute the cell downlink communications signals 202D(1)-202D(R) to the remote units 1006(1)-1006(R) as previously described above with regard to the WDCS 1000 in FIGS. 10A and 10B, and/or both. As discussed below, the selective router circuit 1012 in the WDCS 1000 can receive information from a cell 204(1)-204(N) indicating assignment of subcarrier sets $S_{UE1}$-$S_{UEN}$ to UEs 208(1)-208(R). The PRACH analyzer circuits 1024(1)-1024(R) are configured to analyze the cell downlink communications signals 202D(1)-202D(N) to determine the assignment of the UEs 208(1)-208(R) to the remote units 1006(1)-1006(R) in a given remote unit cluster 1022(1), 1022(2). This information regarding the assignment of subcarrier sets $S_{UE1}$-$S_{UEN}$ to UEs 208(1)-208(R), and the assignment of the UEs 208(1)-208(R) to the remote units 1006(1)-1006(R) can then be used by the selective router circuit 1012 to determine which of the subcarrier sets $S_{UE1}$-$S_{UEN}$ in an uplink radio subframe of a given downlink radio frame 1048(1)-1048(R) are assigned to which remote unit 1006(1)-1006(R) among a plurality of non-contiguous remote units 1006(1)-1006(R) in a given remote unit cluster 1022(1), 1022(2). The selective router circuit 1012 can then selectively combine and distribute the subcarrier sets $S_{UE1}$-$S_{UEN}$ into combined uplink communications signals 202CU(1)-202CU(N) to their assigned cells 204(1)-204(N) based on the determined subcarrier set $S_{UE1}$-$S_{UEN}$ to remote unit 1006(1)-1006(R) assignment.

With reference to FIG. 12A, in this example, the selective router circuit 1012 in the WDCS 1000 includes the controller circuit 1026 and the router circuit 1028. The controller circuit 1026 and a router circuit 1028 of the selective router circuit 1012 are configured to selectively distribute remote uplink communications signals 202U(1)-202U(R) from the remote units 1006(1)-1006(R) to the cells 204(1)-204(N) according to an exemplary process 1300 in FIG. 13. In this regard, the router circuit 1028 is configured to receive the remote uplink communications signals 202U(1)-202U(R) each comprising one or more subcarrier sets $S_{UE1}$-$S_{UE3}$ of the cells 204(1)-204(N) from respective remote units 1006(1)-1006(R) in the remote unit clusters 1022(1)-1022(2) (block 1302 in FIG. 13). The remote uplink communications signal 202U(1) from the remote unit 1006(1) in the WDCS 1000 in FIG. 12A includes subcarrier set $S_{UE1}$, and the remote uplink communications signal 202U(R) includes subcarrier sets $S_{UE2}$, SUES. The controller circuit 1026 is configured to receive the subcarrier assignment indicator 1030(1)-1030(R) from the cells 204(1)-204(N) indicating the assignment of subcarrier sets $S_{UE1}$-$S_{UEN}$ to the UEs 208(1)-208(R) (block 1304 in FIG. 13). The controller circuit 1026 is also configured to determine the assignment of the UEs 208(1)-208(R) to the non-contiguous remote units 206(1)-206(R) in the remote unit cluster 1022(1) (block 1306 in FIG. 11). In this example, the controller circuit 1026 is configured to determine the assignment of the UEs 208(1)-208(R) to the non-contiguous remote units 1006(1)-1006(R) in the remote unit cluster 1022(1) by being configured to receive the UE assignment indicator 1032(1)-1032(R) from each respective remote unit 1006(1)-1006(R) indicating the assignment of UEs 208(1)-208(R) to particular remote units 1006(1)-1006(R) that the UEs 208(1)-208(R) are being serviced through for communications. In this example, the PRACH analyzer circuits 1024(1)-1024(R) are each configured to determine the assignment of UEs 208(1)-208(R) to particular remote units 1006(1)-1006(R) by being configured analyze a PRACH channel in the cell downlink communications signals 202D(1)-202D(N) to identify the one or more UEs 208(1)-208(R) assigned to each remote unit 1006(1)-1006(R) as previously described.

Figure 13:
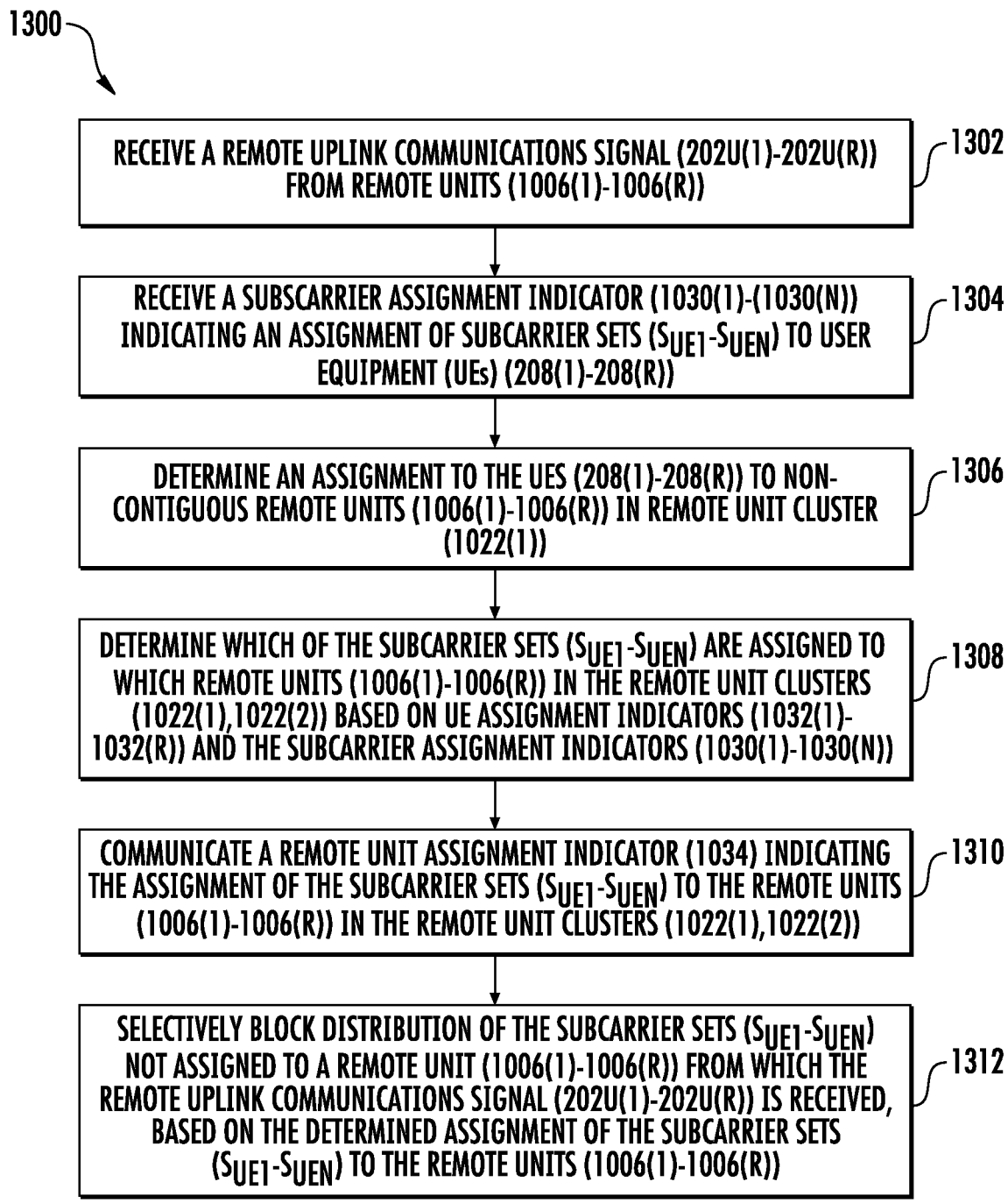
FIG. 13 is a flowchart illustrating an exemplary process of the non-contiguous WDCS in FIGS. 5 and/or 12A of selectively receiving and combining uplink communications signals that contain UE data from UEs communicating to the remote units, into a combined uplink communications signal.

With continuing reference to FIG. 12A, the controller circuit 1026 is then configured to determine which of the subcarrier sets $S_{UE1}$-$S_{UEN}$ are assigned to which remote units 1006(1)-1006(R) in the remote unit clusters 1022(1), 1022(2) based on the UE assignment indicators 1032(1)-1032(R) and the subcarrier assignment indicators 1030(1)-1030(N) (block 1308 in FIG. 13). The controller circuit 1026 is then configured to communicate a remote unit assignment indicator 1034 indicating the assignment of the subcarrier sets $S_{UE1}$-$S_{UEN}$ to the remote units 1006(1)-1006(R) in the remote unit clusters 1022(1), 1022(2) to the router circuit 1028 (block 1310 in FIG. 13). This enables the router circuit 1028 to use the information in the received remote unit assignment indicator 1034 to selectively distribute the received subcarrier sets $S_{UE1}$-$S_{UEN}$ from the remote units 1006(1)-1006(R) based on their assignment to the subcarrier sets $S_{UE1}$-$S_{UEN}$. To selectively route, the router circuit 1028 may be configured to selectively block distribution of subcarrier sets $S_{UE1}$-$S_{UEN}$ from the received remote uplink communications signals 202U(1)-202U(R) not assigned to the remote unit 1006(1)-1006(R) from which the remote uplink communication signal 202U(1)-202U(R) is received (block 1312 in FIG. 13).

With continuing reference to FIG. 12A, the router circuit 1028 includes uplink subcarrier processing circuits 1050(1)-1050(R) each communicatively coupled to a remote unit 1006(1)-1006(R) to process the subcarrier sets $S_{UE1}$-$S_{UEN}$ in the received remote uplink communications signals 202U(1)-202U(R). Each uplink subcarrier processing circuit 1050(1)-1050(R) is configured to selectively block distribution of subcarrier sets $S_{UE1}$-$S_{UEN}$ from the received remote uplink communications signals 202U(1)-202U(R) not assigned to the remote unit 1006(1)-1006(R) from which the remote uplink communication signal 202U(1)-202U(R) is received. A combiner circuit 1052 is also included in the router circuit 1028 to combine the passed (i.e., not blocked) subcarrier sets $S_{UE1}$-$S_{UEN}$ from the received remote uplink communications signals 202U(1)-202U(R) for each cell 204(1)-204(N) to respective combined uplink communications signals 202CU(1)-202CU(N) that are then distributed to the cell 204(1)-204(N).

Figure 12B:
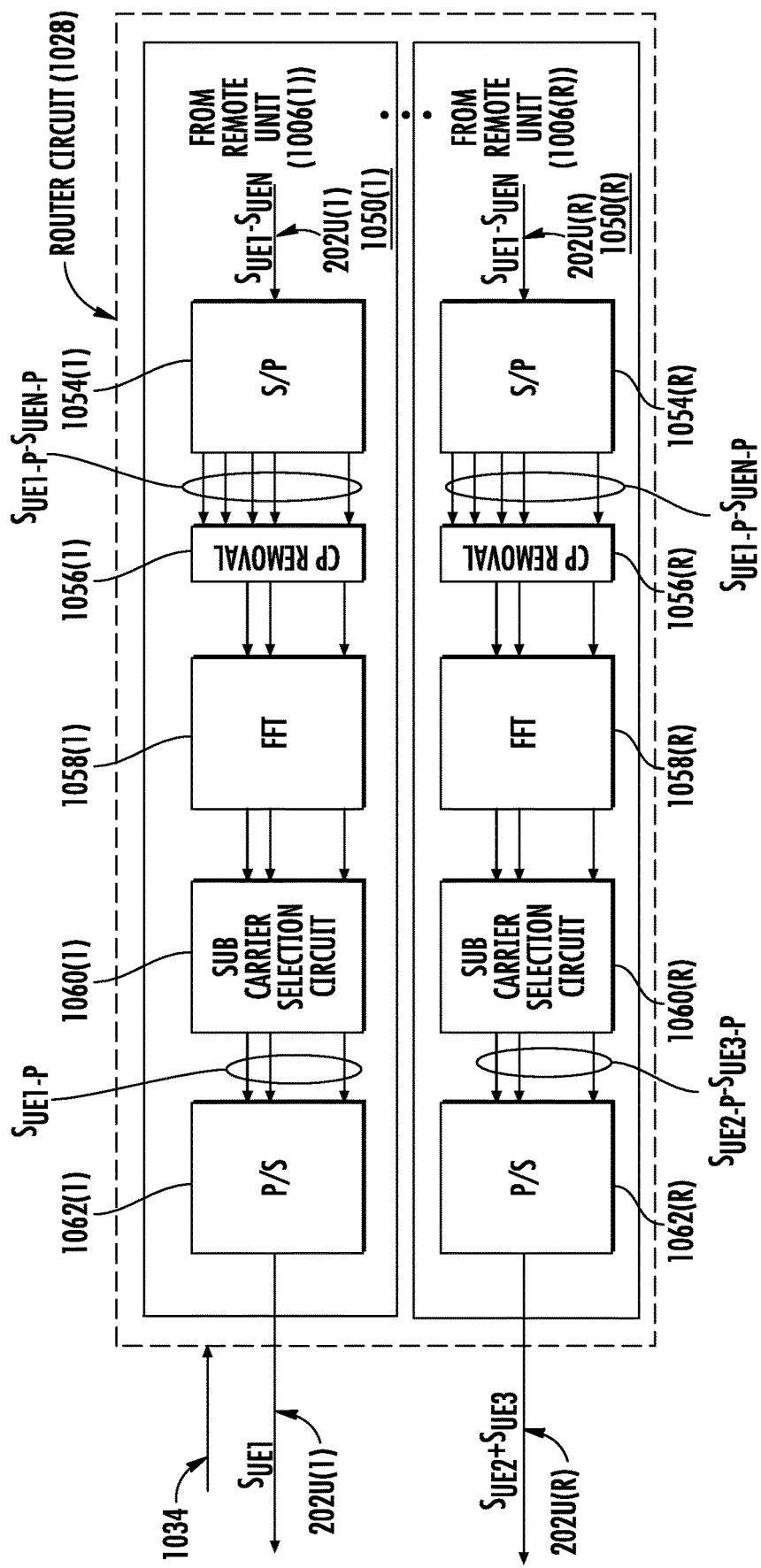
FIG. 12B is a schematic diagram illustrating more exemplary details of the uplink path components of a router circuit in the selective router circuit in FIG. 12A.

FIG. 12B is a schematic diagram illustrating more exemplary details of the uplink path components of the router circuit 1028 in the selective router circuit 1012 in the WDCS 1000 in FIG. 10A. In this example, the router circuit 1028 includes a plurality of the uplink subcarrier processing circuits 1050(1)-1050(R) each communicatively coupled to a remote unit 206(1)-206(R) to process the subcarrier sets $S_{UE1}$-$S_{UEN}$ in the received remote uplink communications signals 202U(1)-202U(R). Each uplink subcarrier processing circuit 1050(1)-1050(R) includes a respective serial-to-parallel (S/P) conversion circuit 1054(1)-1054(R) configured to convert the plurality of subcarrier sets $S_{UE1}$-$S_{UEN}$ in the remote uplink communications signals 202U(1)-202U(R) to a plurality of parallel subcarrier sets $S_{UE1-P}$-$S_{UEN-P}$. Each uplink subcarrier processing circuit 1050(1)-1050(R) includes a CP removal circuit 1056(1)-1056(R) configured to remove a CP to each passed one or more parallel subcarrier sets $S_{UE1-P}$-$S_{UEN-P}$. Each uplink subcarrier processing circuit 1050(1)-1050(R) also includes a Fourier filter circuit 1058(1)-1058(R) configured to filter the parallel subcarrier sets $S_{UE1-P}$-$S_{UEN-P}$. Each uplink subcarrier processing circuit 1050(1)-1050(R) also includes a subcarrier selection circuit 1060(1)-1060(R) configured to pass the parallel subcarrier sets $S_{UE1-P}$-$S_{UEN}$—P based on the remote unit assignment indicator 1034. In this example, the remote unit assignment indicator 1034 indicates that subcarrier set $S_{UE1}$ is assigned to remote unit 1006(1), and subcarrier sets $S_{UE2}$, SUES are assigned to remote unit 1006(R) as also shown in FIG. 12A. Thus, the subcarrier selection circuit 1060(1) passes parallel subcarrier set $S_{UE1-P}$, and subcarrier selection circuit 1060(R) passes parallel subcarrier sets $S_{UE2-P}$, $S_{UE3-P}$ in this example. For example, subcarrier selection circuits 1060(1)-1060(R) may be configured to zero out one or more subcarriers parallel subcarrier sets $S_{UE1-P}$, $S_{UEN-P}$ not assigned to its respective remote unit 1006(1)-1006(R) based on the remote unit assignment indicator 1034 to then effectively pass the assigned parallel subcarrier sets $S_{UE1-P}$-$S_{UEN-P}$. Each uplink subcarrier processing circuit 1050(1)-1050(R) also includes a respective parallel-to-serial (P/S) conversion circuit 1062(1)-1062(R) configured to convert the passed one or more parallel subcarrier sets $S_{UE1-P}$-$S_{UE3-P}$ back to serial subcarrier sets $S_{UE1}$-$S_{UE3}$ to be distributed to the combiner circuit 1052 and to the cells 204(1)-204(R).

Note that any of the communications signals, bands, and services described herein may be RF communications signals, bands and services. Supported RF communications services in the WDCSs disclosed herein can include any communications bands desired. Examples of communication services include, but are not limited to, the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The communications bands may include licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink). Further, the WDCS can be configured to support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

A non-contiguous WDCS configured to selectively distribute downlink communications signals to UE from a cell identified as servicing the UE for reducing downlink transmission power, while downlink communication signals not identified as servicing the UE are blocked from being distributed to the remote unit communicating with the UE, including but not limited to the non-contiguous WDCSs 200, 1000 in FIGS. 2, 10A, and 10B, can be provided as a distributed antenna system (DAS). Also, a WDCS selectively receiving and combining uplink communications signals that contain UE data from UEs communicating to the remote units, into a combined uplink communications signal, while blocking uplink communications signals not containing UE data so that the noise and/or interference in such blocked signals are not combined with the combined selectively received uplink communications signals to reduce the overall noise in the combined uplink communications signal, including but not limited to the non-contiguous WDCSs 200, 1000 in FIGS. 5, 12A, and 12B, can be provided as a DAS.

Figure 14:
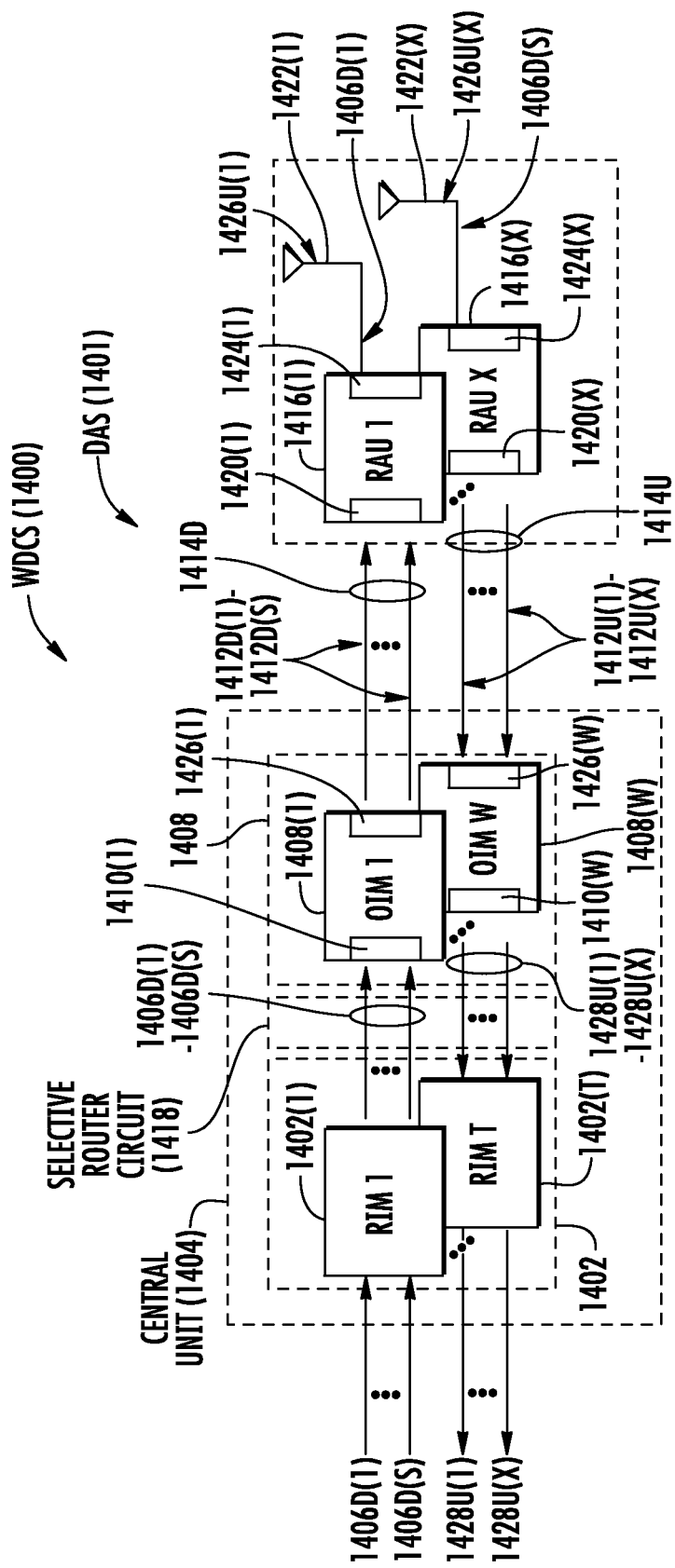
FIG. 14 is a schematic diagram of an exemplary non-contiguous WDCS provided in the form of an optical fiber-based DAS that is configured to selectively distribute downlink communications signals to UE from a cell identified as servicing the UE for reducing downlink transmission power, while downlink communication signals not identified as servicing the UE are blocked from being distributed to the remote unit communicating with the UE, and/or selectively receive and combine uplink communications signals that contain UE data from UEs communicating to the remote units, into a combined uplink communications signal, while blocking uplink communications signals not containing UE data so that the noise and/or interference in such blocked signals are not combined with the combined selectively received uplink communications signals to reduce the overall noise in the combined uplink communications signal.

In this regard, FIG. 14 is a schematic diagram of such an exemplary non-contiguous WDCS 1400 in the form of a non-contiguous DAS 1401. The DAS 1401 in this example is an optical fiber-based DAS. The non-contiguous DAS 1401 in this example is comprised of three (3) main components. One or more radio interfaces provided in the form of radio interface modules (RIMs) 1402(1)-1402(T) are provided in a central unit 1404 to receive and process downlink electrical communications signals 1406D(1)-1406D(S) prior to optical conversion into downlink optical communications signals. The downlink electrical communications signals 1406D(1)-1406D(S) may be received from a base station (not shown) as an example. The downlink electrical communications signals 1406D(1)-1406D(S) can each include one or more subcarrier sets of a cell radio, wherein each subcarrier set is comprised of one or more subcarriers (e.g., radio channels). The RIMs 1402(1)-1402(T) provide both downlink and uplink interfaces for signal processing. The notations "1-S" and "1-T" indicate that any number of the referenced component, 1-S and 1-T, respectively, may be provided.

With continuing reference to FIG. 14, the central unit 1404 is configured to accept the plurality of RIMs 1402(1)-1402(T) as modular components that can easily be installed and removed or replaced in the central unit 1404. In one embodiment, the central unit 1404 is configured to support up to twelve (12) RIMS 1402(1)-1402(12). Each RIM 1402(1)-1402(T) can be designed to support a particular type of radio source or range of radio sources (i.e., frequencies) to provide flexibility in configuring the central unit 1404 and the non-contiguous DAS 1401 to support the desired radio sources. For example, one RIM 1402 may be configured to support the Personal Communication Services (PCS) radio band. Another RIM 1402 may be configured to support the 700 MHz radio band. In this example, by inclusion of these RIMs 1402, the central unit 1404 could be configured to support and distribute communications signals, including those for the communications services and communications bands described above as examples.

The RIMs 1402(1)-1402(T) may be provided in the central unit 1404 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 14, the downlink electrical communications signals 1406D(1)-1406D(S) may be distributed to a plurality of optical interfaces provided in the form of optical interface modules (OIMs) 1408(1)-1408(W) in this embodiment to convert the unlicensed and/or licensed downlink electrical communications signals 1406D(1)-1406D(S). The notation "1-W" indicates that any number of the referenced component 1-W may be provided. The OIMs 1408(1)-1408(W) may be configured to provide one or more optical interface components (OICs) that contain optical-to-electrical (O-E) and electrical-to-optical (E-O) converters, as will be described in more detail below. The OIMs 1408(1)-1408(W) support the radio bands that can be provided by the RIMs 1402(1)-1402(T), including the examples previously described above.

The OIMs 1408(1)-1408(W) each include E-O converters 1410(1)-1410(W) to convert the downlink electrical communications signals 1406D(1)-1406D(S) into downlink optical communications signals 1412D(1)-1412D(S). The downlink optical communications signals 1412D(1)-1412D(S) are communicated over downlink optical fiber communications medium 1414D to a plurality of remote units provided in the form of remote antenna units 1416(1)-1416(X). A selective router circuit 1418 can be provided to selective block certain subcarrier sets and/or subcarriers in the downlink optical communications signals 1412D(1)-

1412D(S) distributed to the respective remote antenna units 1416(1)-1416(X) based on subcarriers associated with the respective remote antenna units 1416(1)-1416(X). The remote antenna units 1416(1)-1416(X) are arranged non-contiguously to each other based on their supported cell radio. The notation "1-X" indicates that any number of the referenced component 1-X may be provided. O-E converters 1420(1)-1420(X) provided in the remote antenna units 1416(1)-1416(X) convert the downlink optical communications signals 1412D(1)-1412D(S) back into the downlink electrical communications signals 1406D(1)-1406D(S), which are provided to antennas 1422(1)-1422(X) in the remote antenna units 1416(1)-1416(X) to user equipment (not shown) in the reception range of the antennas 1422(1)-1422(X).

E-O converters 1424(1)-1424(X) are also provided in the remote antenna units 1416(1)-1416(X) to convert uplink electrical communications signals 1426U(1)-1426U(X) received from user equipment (not shown) through the antennas 1422(1)-1422(X) into uplink optical communications signals 1412U(1)-1412U(X). The remote antenna units 1416(1)-1416(X) communicate the uplink optical communications signals 1412U(1)-1412U(X) over an uplink optical fiber communications medium 1414U to the OIMs 1408(1)-1408(W) in the central unit 1404. The OIMs 1408(1)-1408(W) include O-E converters 1426(1)-1426(W) that convert the received uplink optical communications signals 1412U(1)-1412U(X) into uplink electrical communications signals 1428U(1)-1428U(X), which are processed by the RIMs 1402(1)-1402(T) and provided as uplink electrical communications signals 1428U(1)-1428U(X). The central unit 1404 may provide the uplink electrical communications signals 1428U(1)-1428U(X) to a source transceiver, such as a cell radio provided as base station or other communications system. The selective router circuit 1418 may be configured to selective block certain subcarrier sets and/or subcarriers in the 1428U(1)-1428U(X) distributed to the respective remote antenna units 1416(1)-1416(X) based on subcarriers associated with the respective remote antenna units 1416(1)-1416(X). Note that the downlink optical fiber communications medium 1414D and uplink optical fiber communications medium 1414U connected to each remote antenna unit 1416(1)-1416(X) may be a common optical fiber communications medium, wherein for example, wave division multiplexing (WDM) may be employed to provide the downlink optical communications signals 1412D(1)-1412D(S) and the uplink optical communications signals 1412U(1)-1412U(X) on the same optical fiber communications medium.

Figure 15:
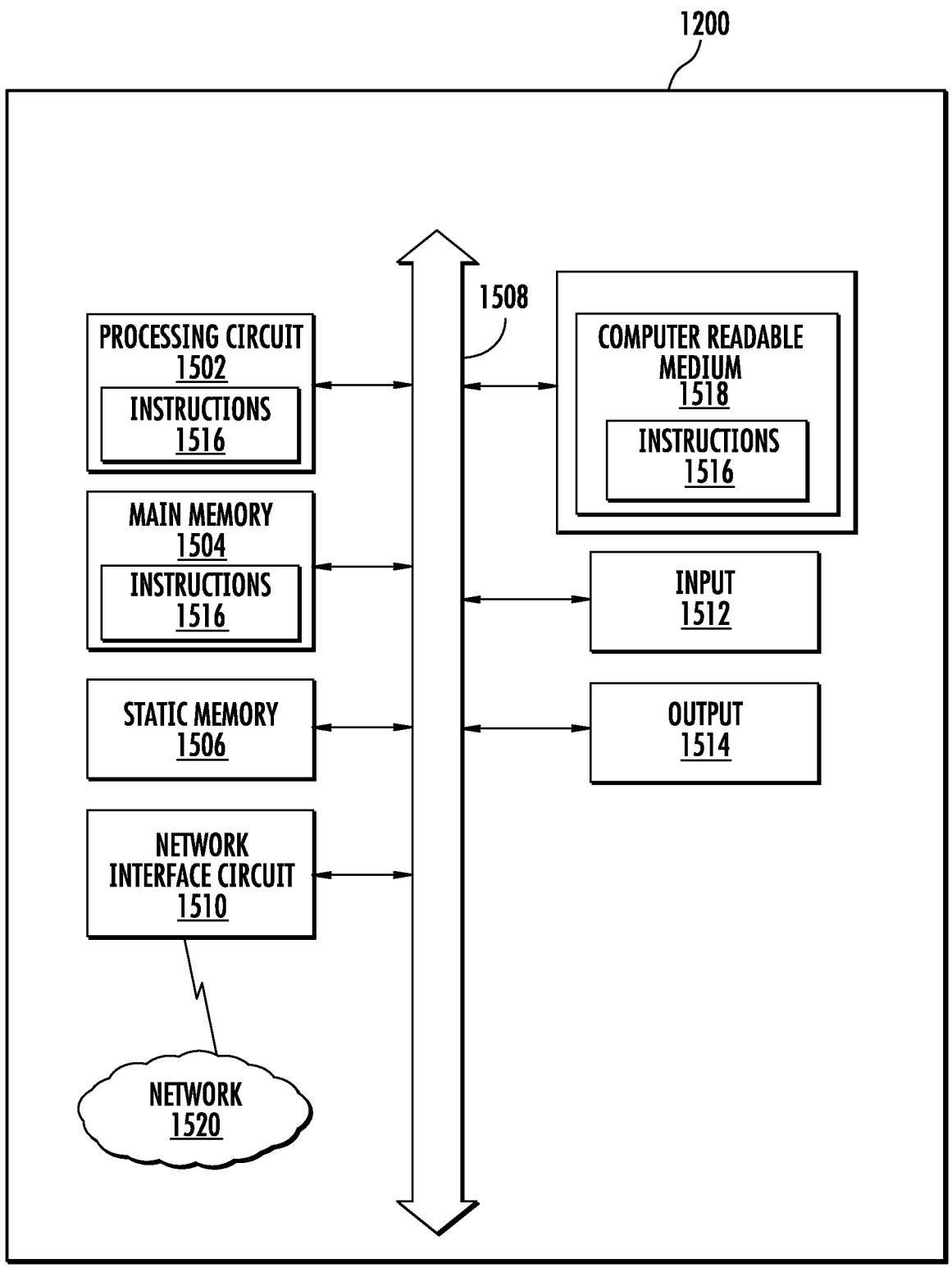
FIG. 15 is a schematic diagram of a generalized representation of an exemplary computer system that can be included in any component in the WDCS in FIGS. 2, 5, 10A-10B, 12A-12B, and 14, including but not limited to the central units, remote units, selective router circuits, and controllers therein, and which can be configured to execute instructions from an exemplary computer readable medium or link for selectively distributing downlink communications signals to UE from a cell identified as servicing the UE for reducing downlink transmission power, while downlink communication signals not identified as servicing the UE are blocked from being distributed to the remote unit communicating with the UE, and/or selectively receiving and combining uplink communications signals that contain UE data from UEs communicating to the remote units, into a combined uplink communications signal, while blocking uplink communications signals not containing UE data so that the noise and/or interference in such blocked signals are not combined with the combined selectively received uplink communications signals to reduce the overall noise in the combined uplink communications signal.

FIG. 15 is a schematic diagram representation of additional detail illustrating a computer system 1500 that could be employed in any of the circuits in a non-contiguous WDCS configured to selectively distribute downlink communications signals to UE from a cell identified as servicing the UE for reducing downlink transmission power, while downlink communication signals not identified as servicing the UE are blocked from being distributed to the remote unit communicating with the UE, and/or configured to selectively receive and combine uplink communications signals that contain UE data from UEs communicating to the remote units, into a combined uplink communications signal, while blocking uplink communications signals not containing UE data so that the noise and/or interference in such blocked signals are not combined with the combined selectively received uplink communications signals to reduce the overall noise in the combined uplink communications signal, including but not limited to the non-contiguous WDCSs 200, 1000, 1400 in FIGS. 2, 5, 10A-10B, 12A-12B, and 14. For example, the computer system 1500 could provide the selective router circuits 212, 1012, 1418, the controller circuits 1026, and/or the router circuit 1028 in WDCSs 200, 1000, 1400 in FIGS. 2, 5, 10A-10B, 12A-12B, and 14. In this regard, the computer system 1500 is adapted to execute instructions from an exemplary computer-readable medium to perform these and/or any of the functions or processing described herein.

In this regard, the computer system 1500 in FIG. 15 may include a set of instructions that may be executed to program and configure programmable digital signal processing circuits in a WDCS for supporting scaling of supported communications services. The computer system 1500 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1500 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1500 in this embodiment includes a processing circuit or processor 1502, a main memory 1504 (e.g., read-only memory (ROM), flash memory, dynamic random access memory (DRAM), such as synchronous DRAM (SDRAM), etc.), and a static memory 1506 (e.g., flash memory, static random access memory (SRAM), etc.), which may communicate with each other via a data bus 1508. Alternatively, the processor 1502 may be connected to the main memory 1504 and/or static memory 1506 directly or via some other connectivity means. The processor 1502 may be a controller, and the main memory 1504 or static memory 1506 may be any type of memory.

The processor 1502 represents one or more general-purpose processing circuits, such as a microprocessor, central processing unit, or the like. More particularly, the processor 1502 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1502 is configured to execute processing logic in instructions for performing the operations and steps discussed herein.

The computer system 1500 may further include a network interface circuit 1510. The computer system 1500 also may or may not include an input 1512, configured to receive input and selections to be communicated to the computer system 1500 when executing instructions. The computer system 1500 also may or may not include an output 1514, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1500 may or may not include a data storage device that includes instructions 1516 stored in a computer-readable medium 1518. The instructions 1516 may also reside, completely or at least partially, within the main memory 1504 and/or within the processor 1502 during execution thereof by the computer system 1500, the main memory 1504 and the processor 1502 also constituting computer-readable medium. The instructions 1516 may further be transmitted or received over a network 1520 via the network interface circuit 1510.

While the computer-readable medium 1518 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A selective router circuit for selectively routing downlink communications signals in a wireless distributed communications system (WDCS), the selective router circuit comprising:
   a router circuit; and
   a controller circuit
   wherein the router circuit is configured to:
      receive a cell downlink communications signal comprising a plurality of subcarrier sets transmitted by a cell radio, each subcarrier set among the plurality of subcarrier sets comprising one or more subcarriers, each subcarrier set assigned to a user equipment (UE) among a plurality of UEs; and
   wherein the controller circuit is configured to:
      receive a subcarrier assignment indicator indicating the assignment of one or more subcarrier sets among the plurality of subcarrier sets to each UE among the plurality of UEs;
      determine an assignment of one or more UEs to a remote unit among a plurality of non-contiguous remote units in a remote unit cluster in a WDCS;
      determine which of the one or more subcarrier sets among the plurality of subcarrier sets are assigned to which remote unit among the plurality of non-contiguous remote units in the remote unit cluster, based on the determined assignment of the one or more UEs to the remote unit among the plurality of non-contiguous remote units and the subcarrier assignment indicator; and
      communicate to the router circuit the remote unit assignment indicator indicating the assignment of the one or more subcarrier sets among the plurality of subcarrier sets to each remote unit among the plurality of non-contiguous remote units in the remote unit cluster;
   wherein the router circuit uses information in the received remote unit assignment indicator to selectively distribute to each remote unit among the plurality of non-contiguous remote units in the remote unit cluster the one or more subcarrier sets assigned to the remote unit.

2. The selective router circuit of claim 1, further configured to selectively block distribution to each remote unit among the plurality of non-contiguous remote units, the one or more subcarrier sets among the plurality of subcarrier sets not assigned to the remote unit, based on the determined assignment of the one or more subcarrier sets among the plurality of subcarrier sets to each remote unit among the plurality of non-contiguous remote units in the remote unit cluster.

3. The selective router circuit of claim 1, wherein the router circuit is further configured to selectively block distribution to each remote unit among the plurality of non-contiguous remote units, the one or more subcarrier sets among the plurality of subcarrier sets not assigned to the remote unit, based on the remote unit assignment indicator.

4. The selective router circuit of claim 1, wherein the router circuit comprises a plurality of downlink subcarrier processing circuits each communicatively coupled to a remote unit among the plurality of non-contiguous remote units in the remote unit cluster, each downlink subcarrier processing circuit among the plurality of downlink subcarrier processing circuits comprising:
   a serial-to-parallel conversion circuit configured to convert the plurality of subcarrier sets in the cell downlink communications signal to a plurality of parallel subcarrier sets;
   a subcarrier selection circuit configured to pass one or more parallel subcarrier sets among the plurality of parallel subcarrier sets based on the remote unit assignment indicator; and
   a parallel-to-serial conversion circuit configured to convert the passed one or more parallel subcarrier sets to the one or more subcarrier sets.

5. The selective router circuit of claim 4, wherein the subcarrier selection circuit is configured to pass the one or more parallel subcarrier sets among the plurality of parallel subcarrier sets by being configured to zero out one or more subcarriers in the plurality of parallel subcarrier sets not assigned to the remote unit based on the remote unit assignment indicator.

6. The selective router circuit of claim 4, wherein each downlink subcarrier processing circuit among the plurality of downlink subcarrier processing circuits further comprises a cyclic prefix (CP) addition circuit configured to add a CP to each passed one or more parallel subcarrier sets.

7. The selective router circuit of claim 1, configured to determine the assignment of the one or more UEs to the remote unit among the plurality of non-contiguous remote units in the remote unit cluster by being configured to receive the UE assignment indicator from each remote unit among the plurality of non-contiguous remote units in the remote unit cluster indicating the assignment of the one or more UEs to the remote unit.

8. The selective router circuit of claim 1,
   wherein the router circuit is further configured to receive a remote uplink communications signal from each remote unit among the plurality of non-contiguous remote units; and
   wherein the controller circuit is configured to determine the assignment of the one or more UEs to each remote unit among the plurality of non-contiguous remote units in the remote unit cluster by analyzing each remote uplink communications signal to identify the one or more UEs assigned to each remote unit.

9. The selective router circuit of claim 8, further comprising a Physical Random Access Channel (PRACH) analyzer circuit configured to determine the assignment of the one or more UEs to the remote unit among the plurality of non-contiguous remote units in the remote unit cluster by being configured analyze a PRACH channel in the remote uplink communications signal to identify the one or more UEs assigned to each remote unit.

10. The selective router circuit of claim 8, wherein the cell downlink communications signal comprises a long term evolution (LTE) cell downlink communications signal comprising a LTE radio frame comprising one or more LTE radio subframes, each LTE radio subframe among the one or more L subframes comprising the plurality of subcarrier sets.

\* \* \* \* \*

UNITED STATES PATENT AND TRADEMARK OFFICE
CERTIFICATE OF CORRECTION

| | | |
|---|---|---|
| PATENT NO. | : 12,010,606 B2 | Page 1 of 1 |
| APPLICATION NO. | : 17/374342 | |
| DATED | : June 11, 2024 | |
| INVENTOR(S) | : Benjamin Imanilov | |

It is certified that error appears in the above-identified patent and that said Letters Patent is hereby corrected as shown below:

In the Claims

In Column 31, Line 21, in Claim 1, after "circuit" insert --;--

In Column 33, Line 2, in Claim 10, after "L" insert --TE--

Signed and Sealed this
Tenth Day of December, 2024

Katherine Kelly Vidal
*Director of the United States Patent and Trademark Office*